(12) United States Patent
Zhao et al.

(10) Patent No.: US 7,979,362 B2
(45) Date of Patent: Jul. 12, 2011

(54) INTERACTIVE DATA MINING SYSTEM

(75) Inventors: Kaidi Zhao, Hoffman Estates, IL (US); Jeffrey G. Benkler, Arlington Heights, IL (US); Weimin Xiao, Hampshire, IL (US); Bing Liu, Winnetka, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 653 days.

(21) Appl. No.: 11/836,849

(22) Filed: Aug. 10, 2007

(65) Prior Publication Data
US 2009/0043714 A1 Feb. 12, 2009

(51) Int. Cl.
G06F 17/00 (2006.01)
G06F 17/20 (2006.01)
(52) U.S. Cl. ............... 706/11; 702/127; 707/776
(58) Field of Classification Search .......... None
See application file for complete search history.

(56) References Cited

U.S. PATENT DOCUMENTS

| | | | |
|---|---|---|---|
| 6,651,049 B1 | 11/2003 | Agrawal et al. | |
| 6,711,577 B1 | 3/2004 | Wong et al. | |
| 7,080,052 B2 | 7/2006 | Busche | |
| 2006/0218619 A1* | 9/2006 | Dommisse et al. | 725/148 |
| 2006/0288031 A1* | 12/2006 | Lee | 707/101 |
| 2007/0288205 A1* | 12/2007 | Vazquez et al. | 702/189 |

OTHER PUBLICATIONS

Bing Liu, et al. "Rule Interestingness Analysis Using OLAP Operations", KDD'06, Aug. 20-23, 2006; Philadelphia, PA, 11 Pages.
Kaidi Zhao, et al. "Opportunity Map: Identifying Causes of Failure", KDD'06, Aug. 20-23, 2006; Philadelphia, PA, 11 Pages.
Szymon Jaroszewicz, et al. "Interestingness of Frequent Itemsets Using Bayesian Networks as Background Knowledge", KDD '04, Aug. 22-25, 2004, Seattle, WA, 9 Pages.
Bing Liu, et al. "Finding Interesting Patterns Using User Expectations", IEEE Transactions on Knowledge and Data Engineering, vol. 11, No. 6, Nov./Dec. 1999; 16 Pages.
Daniel A. Keim, "Information Visualization and Visual Data Mining", IEEE Transactions on Visualization and Computer Graphics, vol. 8, No. 1, Jan.-Mar. 2002; 8 Pages.
Heike Hofmann, et al. "Visualizing Association Rules With Interactive Mosaic Plots"; KDD 2000, Boston, MA; 9 Pages.
Balaji Padmanabhan, et al. "Knowledge Refinement Based on the Discovery of Unexpected Patterns in Data Mining", 2002; 13 Pages.
Kian-Huat Ong, et al. "Crystalclear: Active Visualization of Association Rules", ICDM-02 Workshop on Active Mining; 2002; 6 Pages.

* cited by examiner

Primary Examiner — Jeffrey A Gaffin
Assistant Examiner — Kalpana Bharadwaj
(74) Attorney, Agent, or Firm — John T. Bretscher; Daniel K. Nichols; Valerie M. Davis

(57) ABSTRACT

An interactive data mining system (100, 3000) that is suitable for data mining large high dimensional (e.g., 200 dimension) data sets is provided. The system graphically presents rules in a context allowing users to readily gain an intuitive appreciation of the significance of important attributes (data fields) in the data. The system (100, 3000) uses metrics to quantify the importance of the various data attributes, data values, attribute/value pairs, ranks them according to the metrics and displays histograms and lists of attributes and values in order according to the metric, thereby allowing the user to rapidly find the most interesting aspects of the data. The system explores the impact of user defined constraints and presents histograms and rule cubes including superposed and interleaved rule cubes showing the effect of the constraints.

10 Claims, 25 Drawing Sheets

```
┌─────────────────────────────────────────┐
│ DOUBLE NUMBERS                       ▽  │
│ STRING                                  │
│ ╱DOUBLE NUMBERS╱╱╱╱╱╱╱╱╱╱╱╱╱╱╱╱╱╱╱╱╱╱  │
│ LONG INTEGER NUMBERS                    │
│ DAY: MON, TUE, ETC.                     │
│ DATE AS DDMMYY                          │
│ DATE AS MMDDYY                          │
│ DATE AS YYMMDD                          │
│ DIGIT SEQUENCE (IP, TIME, ETC.)         │
└─────────────────────────────────────────┘
```
⤴ 412

*FIG. 5*

```
┌─────────────────────────────────────────┐
│ CONTINUOUS (AND ORDINAL)             ▽  │
│ ╱CONTINUOUS (AND ORDINAL)╱╱╱╱╱╱╱╱╱╱╱╱  │
│ DISCRETE AND ORDINAL                    │
│ DISCRETE AND CATEGORICAL                │
│ IGNORE                                  │
└─────────────────────────────────────────┘
```
⤴ 414

*FIG. 6*

```
┌─────────────────────────────────────────┐
│ AUTO ENTROPY METHOD                  ▽  │
│ ╱AUTO ENTROPY METHOD╱╱╱╱╱╱╱╱╱╱╱╱╱╱╱╱╱ │
│ FIXED TOTAL BIN NUMBER                  │
│ MANUAL INTERVAL VALUE                   │
│ MANUAL SPLIT VALUE                      │
└─────────────────────────────────────────┘
```
⤴ 416

```
┌──────────────────────────────────────────────────┐
│ ☕ INPUT SPLIT VALUES                     ▭ ▢ ✕  │
│ PLEASE SPECIFY THE SPLIT VALUES YOU WANT TO USE: │
│ ┌────────────────────────┐ ┌──────────┬────────┐ │
│ │                        │ │ADD VALUE │ DELETE │ │─ 808
│ └────────────────────────┘ └──────────┴────────┘ │
│ ┌──────────────────────────────────────────────┐ │
│ │ 14.0                           804           │ │
│ │ 19.5                                         │ │─ 806
│ │ 21.0                                         │ │
│ └──────────────────────────────────────────────┘ │
│        ┌────────┐              ┌──────────────┐  │
│        │ CANCEL │─812     810─│ OK & CLOSE   │  │
│        └────────┘              └──────────────┘  │
└──────────────────────────────────────────────────┘
```
802 ↗

*FIG. 8*

NEW ATTRIBUTE PREVIEW

NEW ATTRIBUTE PREVIEW

| ATTRIBUTED | ATTRIBUTEF | ATTRIBUTEZ |
|---|---|---|
| 88 | 82 | 160.0 |
| 110 | 83 | 183.0 |
| 165 | 71 | 226.0 |
| 70 | 83 | 143.0 |
| 67 | 83 | 140.0 |
| 215 | 71 | 276.0 |
| 67 | 78 | 135.0 |
| 67 | 78 | 135.0 |
| 60 | 82 | 132.0 |
| 68 | 83 | 141.0 |
| 97 | 73 | 160.0 |
| 108 | 77 | 175.0 |

| 5) SIMILAR ORDINAL ATTRIBUTES PAIRS | |
|---|---|
| 4) CATEGORICAL/ORDINAL ATTRIBUTES, INFLUENCE VALUES | |
| 2) ORIDINAL ATTRIBUTE, DECREASE | 3) ORIDINAL ATTRIBUTE, STABLE |
| 0) DATA SUMMARY | 1) ORIDINAL ATTRIBUTE, INCREASE |

FOR CLASS = CLASSB, AND FOR TREND INCREASE TYPE, THE TOP 50 RELATED ATTRIBUTES ARE:
(0) ATTRIBUTEC : 0.625
(1) ATTRIBUTED : 0.625

FOR CLASS = CLASSA, AND FOR TREND INCREASE TYPE, THE TOP 50 RELATED ATTRIBUTES ARE:
(0) ATTRIBUTEA : 0.201530

FOR CLASS = CLASSC, AND FOR TREND INCREASE TYPE, THE TOP 50 RELATED ATTRIBUTES ARE:
(0) ATTRIBUTEE : 0.173469
(1) ATTRIBUTEA : 0.135204

| 0) DATA SUMMARY | 1) ORIDINAL ATTRIBUTE, INCREASE |
|---|---|
| 5) SIMILAR ORDINAL ATTRIBUTE PAIRS | |
| 4) CATEGORICAL/ORDINAL ATTRIBUTES, INFLUENCE VALUES | |
| 2) ORIDINAL ATTRIBUTE, DECREASE | 3) ORIDINAL ATTRIBUTE, STABLE |

FOR CLASS = CLASSB, AND FOR
TREND DECREASE TYPE, THE TOP
50 RELATED ATTRIBUTES ARE:
(0) ATTRIBUTEA : 0.625
(1) ATTRIBUTEE : 0.625

FOR CLASS = CLASSA, AND FOR
TREND DECREASE TYPE, THE TOP 50
RELATED ATTRIBUTES ARE:
(0) ATTRIBUTEC : 0.201530
(1) ATTRIBUTED : 0.201530

FOR CLASS = CLASSC, AND FOR
TREND DECREASE TYPE, THE TOP 50
RELATED ATTRIBUTES ARE:
(0) ATTRIBUTEC : 0.173469
(1) ATTRIBUTED : 0.173469

*FIG. 15*

```
┌─────────────────────────────┬──────────────────────────────────┐
│  0) DATA SUMMARY            │  1) ORIDINAL ATTRIBUTE, INCREASE │
├─────────────────────────────┴──────────────────────────────────┤
│              5) SIMILAR ORDINAL ATTRIBUTES PAIRS               │
├────────────────────────────────────────────────────────────────┤
│         4) CATEGORICAL/ORDINAL ATTRIBUTES, INFLUENCE VALUES    │
├─────────────────────────────┬──────────────────────────────────┤
│ 2) ORIDINAL ATTRIBUTE,      │  3) ORIDINAL ATTRIBUTE, STABLE   │
│    DECREASE                 │                                  │
└─────────────────────────────┴──────────────────────────────────┘
```
↗ 1602

FOR CLASS = CLASSB, AND FOR TREND STABLE TYPE, THE TOP 50 RELATED ATTRIBUTES ARE:

FOR CLASS = CLASSA., AND FOR TREND STABLE TYPE, THE TOP 50 RELATED ATTRIBUTES ARE:

FOR CLASS = CLASSC, AND FOR TREND STABLE TYPE, THE TOP 50 RELATED ATTRIBUTES ARE:

| 2) ORIDINAL ATTRIBUTE, DECREASE | 3) ORIDINAL ATTRIBUTE, STABLE |
|---|---|
| 0) DATA SUMMARY | 1) ORIDINAL ATTRIBUTE, INCREASE |
| 5) SIMILAR ORDINAL ATTRIBUTES PAIRS ||
| 4) CATEGORICAL/ORDINAL ATTRIBUTES, INFLUENCE VALUES ||

CATEGORICAL ATTRIBUTES (ALL) RANKED BY THEIR "INFLUENCE" VALUES AS TO ALL THE CLASSES.
(0) ATTRIBUTEG : 9.302649
(1) ATTRIBUTEF : 0.512658

ORDIANAL ATTRIBUTES (ALL) RANKED BY THEIR "INFLUENCE" VALUES AS TO ALL THE CLASSES.
(0) ATTRIBUTEC : 2.074558
(1) ATTRIBUTEA : 1.697049
(2) ATTRIBUTEB : 1.460218
(3) ATTRIBUTED : 1.252754
(4) ATTRIBUTEE : 0.332257

*FIG. 17*

INTERACTIVE DATA MINING SYSTEM

FIELD OF THE INVENTION

The present invention relates generally to data mining.

BACKGROUND

Proliferation of computers throughout developed societies has enabled the collection and storage of many types of large data sets, including for example, information on banking transactions, medical data and information on communications (e.g., telephone and email records). Thanks to orders of magnitude increases in data storage capacity and processing power, there is the potential to exploit this data for various purposes. Thus, the field of Data Mining has arisen with the aim of finding techniques for extracting useful information from large data sets.

It is well known that many existing data mining techniques often produce a large number of rules, which make it very difficult to identify interesting rules by manual inspection. This is called the interestingness problem. Over the years, many techniques have been proposed to deal with this problem in order to help the user find useful knowledge. However, despite these efforts, interestingness remains a difficult problem. Few existing techniques have made it to real life applications. The difficulty is often attributed to the fact that interestingness is highly subjective. It depends on the user's current needs and his/her existing domain knowledge. While this is true, the inventors believe that another reason for the limited success is that workers in the art have perhaps looked in the wrong direction. Data mining software following the current rule mining paradigm, tends to fragment the knowledge space, generating massive rules, and at the same times, creating a large number of holes in the space of useful knowledge that could potentially be gleaned from the data thus making it difficult for the user to find interesting knowledge.

One important type of data that is subjected to data mining is "class" labeled data. For example a medical database can include, for each person, a myriad of different patient history data items (called "attributes" hereinbelow), such as age, sex, indication of any family history of disease, etc and a data item which indicates whether the person succumbed to a disease that is the subject of the database. The latter data item (attribute) would be the class attribute.

Another example of a type of data that can be productively subjected to data mining is mobile telephone call records. Mobile telephone records that are collected by network service providers contain a myriad of different parameters related to each telephone call. One application of such data is to help understand what leads to failed calls so that network service can be improved. For this application the class label would be an attribute that indicates the final disposition of the call, i.e., failed during set up, dropped while in progress, or ended successfully.

The applications of class labeled data can be divided into two categories: (1) Predictive data mining: the objective of which is to build predictive or classification models that can be used to classify future cases or to predict the classes of future cases and which has been the focus of research of the machine learning community. (2) Diagnostic data mining: the objective of which is usually to understand the data and to find causes of some problems in order to solve the problems.

For software designed to facilitate gleaning understanding from data, no prediction or classification is needed. The class labels are already known. The objective is not prediction, but to better understand the data and to find causes of particular outcomes (classes, e.g., call failures, patient succumbing to particular disease) or to identify situations in which particular outcomes are more likely to occur. That is, the software user wants interesting and actionable knowledge. Interestingness evaluation of rules is thus the key. Clearly, the discovered knowledge has to be understandable.

As the data set is a typical classification data set, rules that characterize the subject of the data mining are of the following form:

$X \rightarrow y$, where X is a set of conditions and y is a class, e.g., for the mobile telephone example above y∈{failed-during-setup, dropped-while-in-progress, ended-successfully}. The system described herein focuses on helping the user identify interesting knowledge based on such rules. These rules basically give the conditional probabilities of $Pr(y|X)$, which are exactly what a diagnostic data mining application is looking for. Moreover, such rules are easily understood.

It is easy to see that such rules are classification rules, which can be produced by classification algorithms such as decision trees and rule induction, and class association rule mining. However, traditional classification techniques such as decision trees and rule induction are not suitable for the task due to three main reasons:

(1) A typical classification algorithm only finds a very small subset of the rules that exist in data based on statistical significance. Most of the rules with similar classification performance are not discovered because the objective is to find only enough rules for classification. However, the subset of discovered rules may not be useful in diagnostic data mining. Those useful rules are left undiscovered. We call this the completeness problem.

(2) Due to the completeness problem, the context information of rules is lost, which makes rule analysis later very difficult as the user does not see the complete information. We call this problem the context problem.

(3) Since the rules are for classification purposes, they usually contain many conditions in order to achieve high accuracy. Long rules are, however, of limited use according to our experience because engineers, doctors and other domain experts can hardly take any action based on them. In many cases, it may not be possible to simulate many conditions in the laboratory to find the real causes. Furthermore, the data coverage of long rules may often be so small that it is not worth doing anything about them. We call this problem the long rules problem.

Class association rule mining is found to be more suitable as it generates all rules in data that satisfy the user specified minimum support and minimum confidence thresholds. Class association rules are a special type of association rules with only a class on the right-hand-side of each rule.

Using the above mentioned call record data set, we were able to put several interestingness techniques to the test. We found that most existing interestingness techniques are useful to some extent, but they are "good to have" techniques rather than essential techniques. Thus, they cannot form the core of a rule interestingness analysis system to help the user systematically identify interesting knowledge. To our great surprise, we also discovered that the current rule mining paradigm itself poses a major obstacle for this interestingness analysis task. Below we first summarize the main shortcomings of the current interestingness techniques:

Lack of contexts: Most existing methods treat rules individually. However, a key discovery from our interactions with domain experts is that a single rule is seldom interesting by itself no matter what its support and confidence values are. It is only interesting if it deviates significantly from its siblings.

That is, a rule is only interesting in a meaningful context and in comparisons with others. The user wants to see both the rule and the context.

Existing techniques do not find generalized knowledge from rules (meta-mining): Each individual rule may not be interesting by itself. A group of related rules together may represent an important piece of knowledge. For example, a set of rules from an attribute may show some interesting trend, i.e., as the values of the attribute go up, a call is more likely to fail. Our domain experts suggested that such knowledge is much more useful than individual rules because they may reveal some hidden underlying principles.

Lack of knowledge exploration tools: Due to the subjective nature of interesting knowledge, a systematic method is required for the user to explore the rule space in order to find useful knowledge. Our experiences show that the user-driven interactive discovery may be the best approach. Although there are many existing techniques for visualizing rules, they mostly treat and visualize rules individually, which we found in our applications, was not very effective.

Context is the key to dealing with all the above problems. However, the existing rule mining paradigm eliminates a large amount of contextual information. Let us see why:

In the mining of class association rules, user-specified minimum support (minsup) and minimum confidence (minconf) values are used to ensure that the computation is feasible. Those rules that do not meet the minsup or minconf requirements are not generated. However, they can form important context information for other rules and generalized knowledge. Such contextual information is thus lost.

For example, an attribute B has three possible values, a, b, d, and C is the class attribute. Due to the minsup we only find the rule B=a→C=c, where c is a class value. (Note that it is common practice that C can be omitted at the right side of the formula. Alternatively, the above rule can also be written as (B=a, C=c) or (B=a, c)). The other two possible rules, B=b→c and B=d→c, which form the context for B=a→c, are not found because they do not satisfy the minsup. We call them holes (or gaps) in the knowledge space. Then rule B=a→c does not have a context. We also may not be able to find any generalized knowledge about the attribute due to incomplete information or the holes. Hence, we say that the current mining paradigm fragments the knowledge space and creates discontinuity in the space, which make the understanding and exploration of knowledge by human users very difficult.

What is needed is a new approach to address all the above mentioned shortcomings.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 5-7 are drop down menus of the third window shown in FIG. 4;

FIG. 8 is a dialog box that is launched from the third window shown in FIG. 3 and is used to manually input discretization bounds;

FIGS. 9-10 are dialog boxes launched from the third window shown in FIG. 3 and are used in creating and previewing user defined derived attributes;

FIG. 14 is second view of the side panel shown in FIG. 13 showing content under a first tab;

FIG. 15 is a third view of the side panel shown in FIG. 13 showing content under a second tab;

FIG. 16 is a fourth view of the side panel shown in FIG. 13 showing content under a third tab;

FIG. 17 is fifth view of the panel shown in FIG. 13 showing content under a fourth tab;

Figure 1:
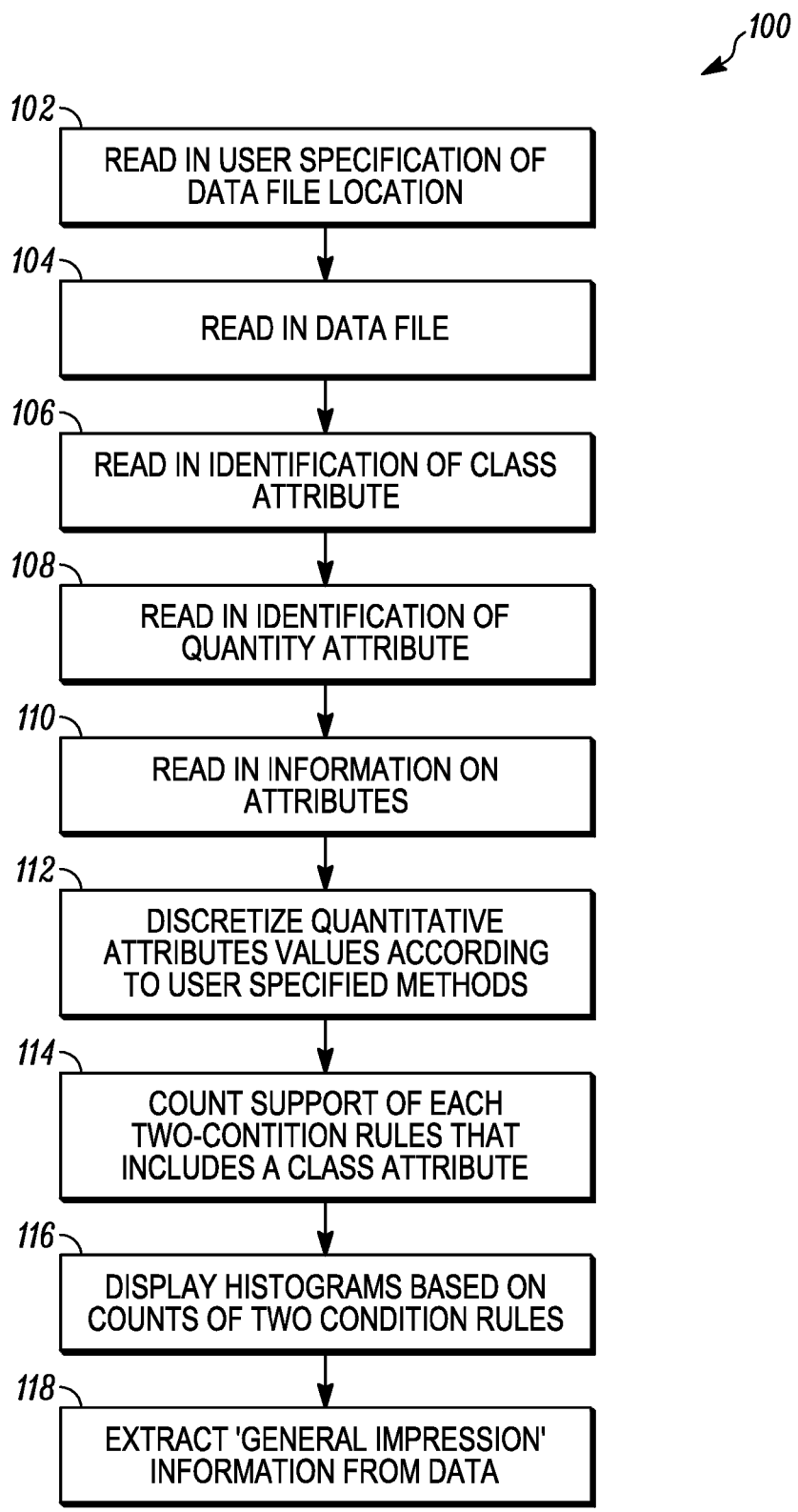
FIG. 1 is a high level flowchart showing certain operations of data mining software according to an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to diagnostic data mining. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of data mining described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 2:
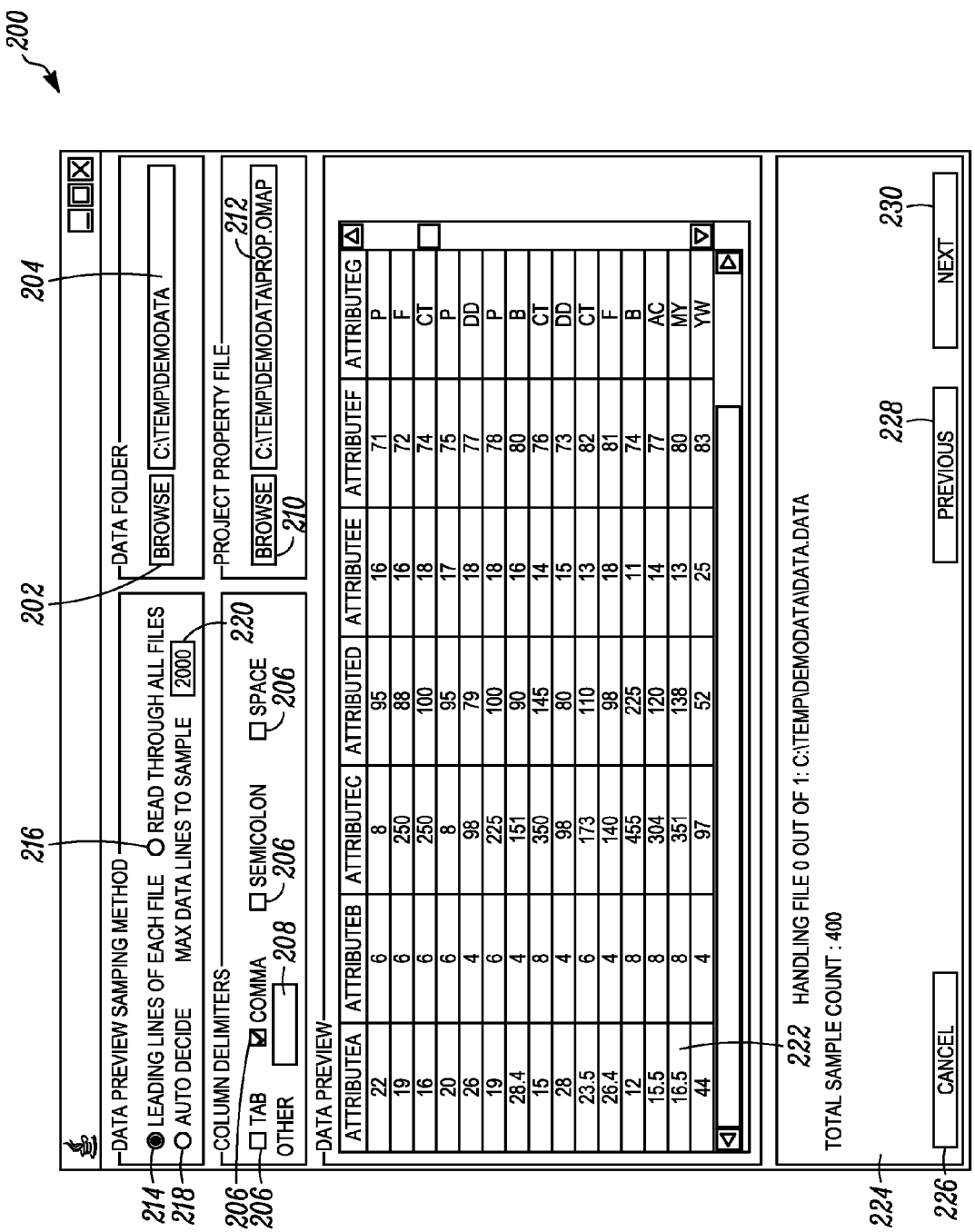
FIG. 2 is a first window of the data mining software, used to specify the location and format of a file containing a data set and the location of a project property file.

FIG. 1 is a high level flowchart showing certain operations of data mining software 100 according to an embodiment of the invention. Referring to FIG. 1 in block 102 a user's specification of the location of a data file that includes a data set is read in. In block 104 the data file is read in. FIG. 2 is a first window 200 of the data mining software 100 that is used to specify the location and format of a file containing the data set and to specify a project file. The first window 200 may be presented upon starting the data mining software 100 or in response to a user menu action. A first browse button 202 allows the user to bring up a file directory navigation window (not shown) for selecting a directory in which a data file in which the data set to be mined is located. A full path for the data folder appears in a first text box 204. For large data sets the data may be stored in multiple files located in the same directory and/or its sub-directories. The data can also be read from a database, a network connection, etc. A first set of radio buttons 206 allows the user to indicate the type of delimiter (e.g., tab, comma, semicolon, space) that separates successive attribute values in the data file. Alternatively, the user can type non-standard delimiters into a second text box 208. A second browse button 210 allows the user to bring up the file directory navigation window for the purpose of selecting a project property file that specifies various properties for a data mining project that involves the selected data file. The various properties which will be discussed below can also be entered by the user using GUI windows shown in FIGS. 3-11. If they have been previously stored in the property file then the values will be reflected in those GUI windows and can be accepted or altered by the user. A full path for the property file appears in a third text box 212.

A set of radio buttons 214, 216, 218 is used to indicate how data in the data file is to be sampled for the purpose of previewing the data. A first radio button 214 marked "Leading Lines of Each File" is used to indicate that preview data is to be taken from the leading portion of the data file (or each data file in the case that there are multiple data files). A second radio button 216 marked "Read Through All Files" is used to indicate that preview data is to be selected by random sampling from the entire data file or files. The first method of sampling data, selected by radio button 214 is faster but not as accurate if the data distribution in the leading part of the file(s) is not representative of the entire file. The second method selected by radio button 216 while more accurate, takes more time. A third radio button 218 marked "Auto Decide" invokes an automatic process which will initially samples from the leading portion and subsequently, as a background process while the user is working, randomly samples from the entire data file. When the user reaches the GUI window 400 shown in FIG. 4, where the data is needed for computation, the software 100 switches and uses the random sampled data. A fourth text box 220 is used to specify a number of data records to be previewed. Finally, previewed data is shown in a spreadsheet like preview text box 222. The data is organized in columns and rows in the preview text box 222 with one column for each attribute, and one row for each record. The previewed data is not merely used to show the user a sample of the data, it is also used as the basis for at least preliminary discretization, and therefore the choice between the two sampling methods is not insignificant. Note that the user should specify the delimiter using radio buttons 214, 216, 218 before specifying the data folder using the first browse button 202 and the first text box 204 so that once the data file(s) has been identified the software can begin parsing the data file(s) based on the specified delimiter.

A log box 224 is used to report progress of the software 100 in reading the data file. A first cancel button 226 allows the user to cancel selections made in the first window. A previous button 228 is used to close the window 200 and returns the user to an initial splash screen (not shown) for the software 100. A next button 230 is used to bring up a second window 300 shown in FIG. 3.

Figure 3:
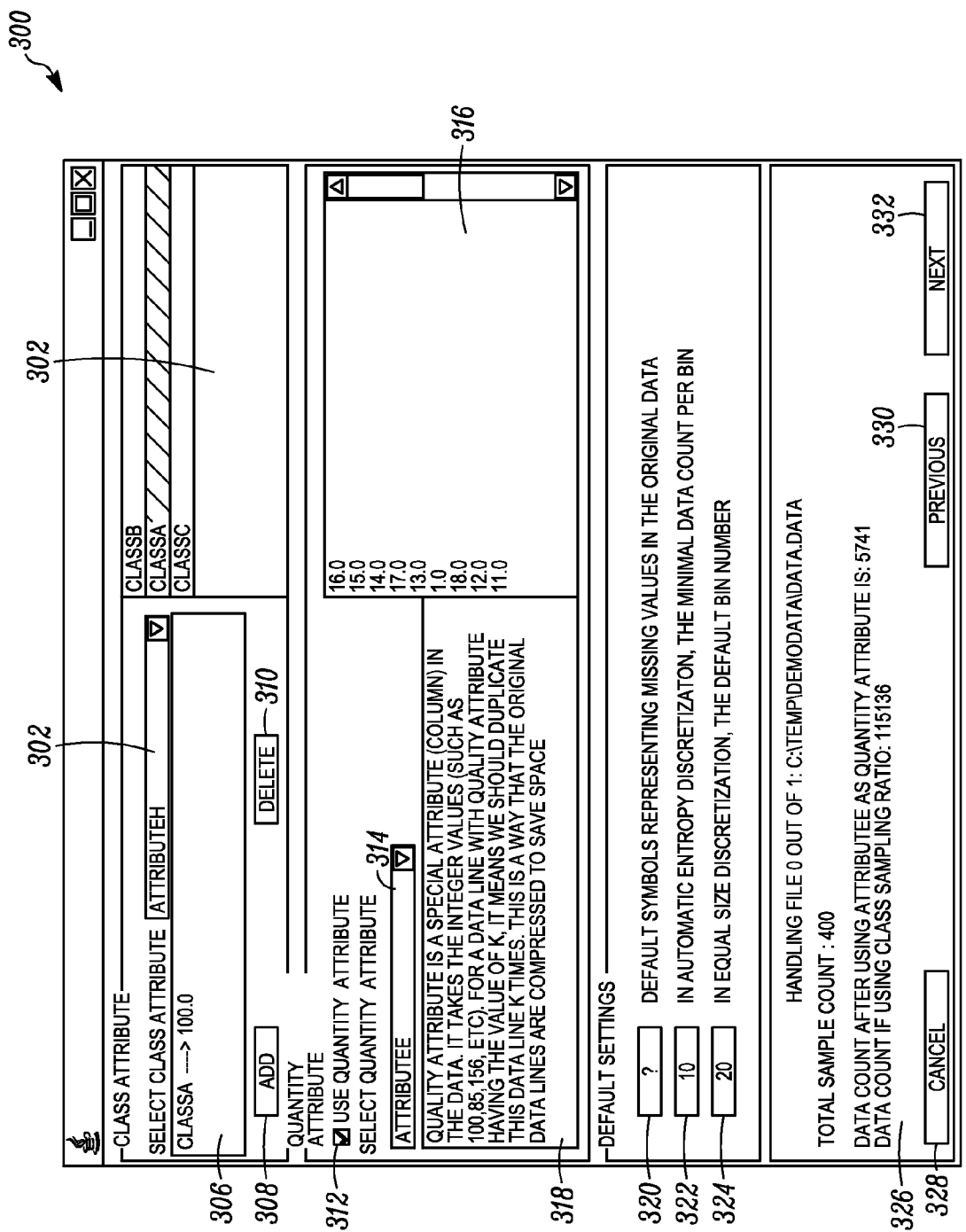
FIG. 3 is a second window of the data mining software, used to identify a class attribute and a quantity attribute in the data set and set other control settings.

Referring again to FIG. 1, in block 106 an identification of a class attribute in the data file is read in and in block 108 an identification of a quantity attribute is read in. FIG. 3 is the second window 300 of the data mining software, used to identify the class attribute and the quantity attribute in the data set. A first drop down menu 302 of the second window 300 allows the user to identify the class attribute in the data set. Once the class attribute is selected using the first drop down 302 menu a list of possible values for the class attribute (class values/ID's) that the software 100 has identified appear in a first text box 304 of the second window 300. When the user selects (e.g., by double clicking) one of the class values in the first text box 304, a dialog box (not shown) will open in which the user can enter a sampling ratio which then appears in a second text box 306. In the second text box 306 100.0 stands for a sampling ratio of 100.0:1. Alternatively, the user can actuate an "Add" button 308 which will open up a dialog box (not shown) for the user to enter a class attribute value and enter a corresponding sampling ratio. The user can select a previously entered sampling ratio in the second text box 306 and delete it using a delete button 310.

In certain cases original data may have been selectively down-sampled (in particular classes) in order to create the data that is read by the data mining software. For example in the above mentioned mobile telephone call record application, one out of every one-hundred records with the class ended-successfully may have been sampled. In such cases the user can restore the original proportions of the different classes by specifying sampling ratio of 100.0 using 304,306 and 308. This is a way to compress the data.

The quantity attribute, if utilized, indicates the number of identical records that each record represents. Using the quantity attribute is another way that effectively allows the data file to be compressed. A first check box 312 is used to specify that the data includes a quantity attribute. A second pull down menu 314 is used to identify the quantity attribute. Once the quantity attribute is selected values of the quantity attribute appear in a third text box 316. A fourth text box 318 includes a message explaining the quantity attribute. A fifth text box 320 shows a default symbol (e.g., "?") that is assumed to represent missing data in the data file. A sixth text box 322 includes a default value for a minimum data count for each bin in the output when adaptive discretization is used and a seventh text box 324 includes a default number of bins for when equal bin size discretization is used. The default values shown in the fifth through seventh text boxes 320, 322, 324 can be edited by the user. In the case of the discretization parameters in the sixth text box 322 and the seventh text box 324, using a third GUI window 400 shown in FIG. 4 the user can override the default values for each individual attribute. A log box 326 is used to report progress of the software 100. In a second line of log box 326 the number of records in the data file which is referred to there as the sample count is shown. A third line of log box 326 shows the number of data records that the data file represents in view of the use of the quantity attribute, if used. In a fourth line of the log box 326 shows the total number of samples that are represented in view of the class sampling ratio specified by the user and shown in text box 306. A cancel button 328 cancels user input in the second window 300, a previous button 330 returns the user to the first window 200, and a next button 332 brings up the third GUI window 400.

Figure 4:
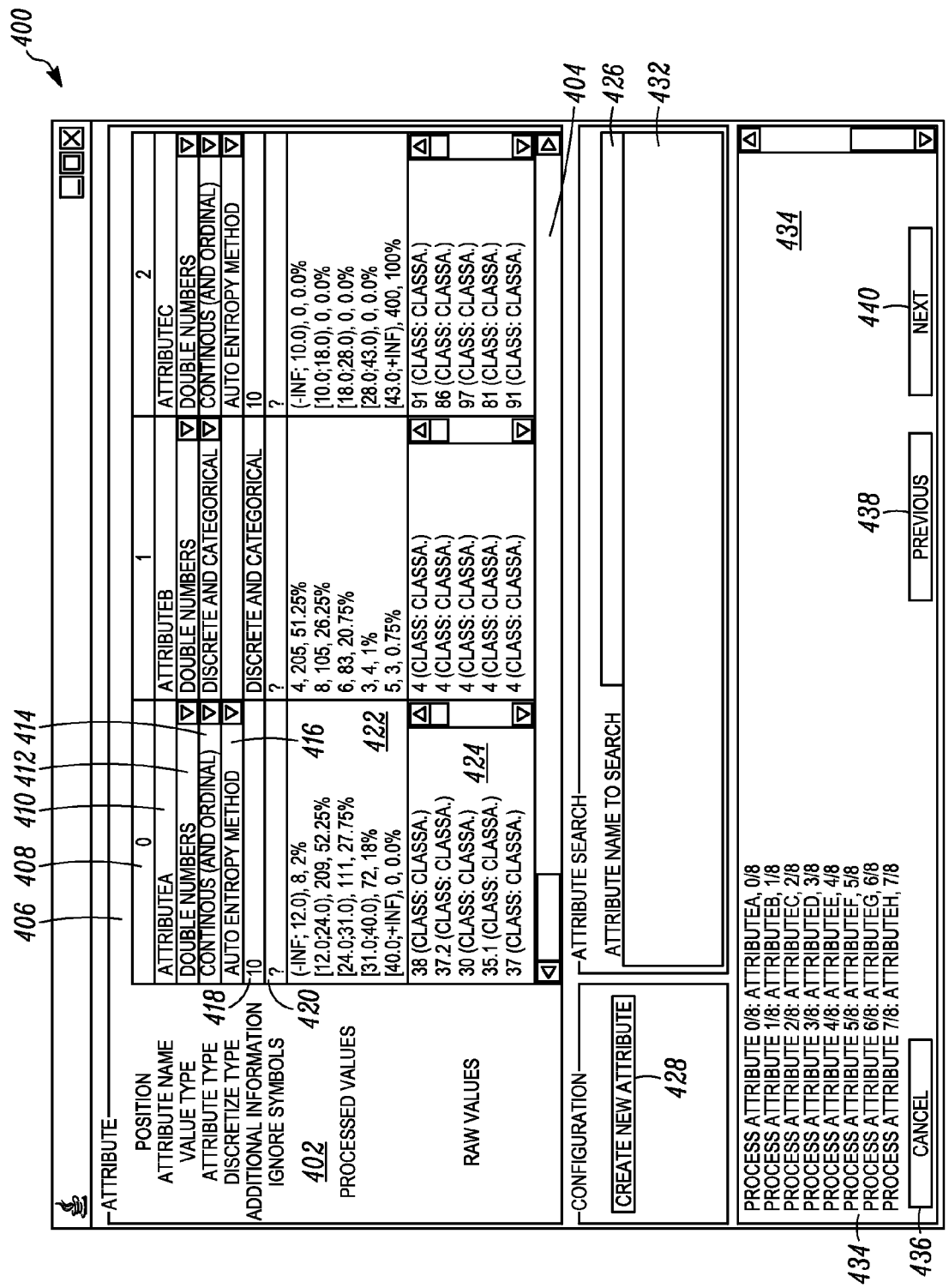
FIG. 4 is a third window of the data mining software, used to input information about the types of data and the discretization methods to be used in processing data to be mined by the data mining software.

In block 110 of FIG. 1 information on the attributes is read in. Referring to FIG. 4, the third GUI window 400 is used to input the information on the attributes. In the third GUI window 400 in a top area 402 information about each attribute is shown and certain information can be edited. The information is arranged in a set of side by side columns with one column for each attribute. Each particular column includes different items of information concerning a particular attribute. As shown in FIG. 4 information for three attributes is shown, however a horizontal scroll bar 404 allows the user to slide the content of the top area 402 so that information for all of the attributes can be accessed. The software 100 will adjust how many attributes to show based on the size of the window 400 and the screen. The content of the columns of the top area 402 will be described using a first column 406 as an example. A first non-editable field 408 gives the attribute position. A second field 410 shows the attribute name as defined in the data file(s). Alternatively, the attribute name can be a user editable field.

A third field 412 includes a first drop down menu used to specify a data type for the attribute. The first drop down menu is shown in FIG. 5. In a current implementation the data type options are "String", "Double Numbers", "Long Integer Numbers", "Day: Mon, Tue, etc.", "Date as DDMMYY", "Date as MMDDYY", "Date as YYMMDD" and "Digit Sequence (IP, Time, etc)". Other data types can be added if needed.

A fourth field 414 includes a second drop down menu used to specify whether the attribute is quantitative in nature, or on the other hand, is categorical e.g., specifies a type, such as a model of cellular handset, or sex or race of a person in a medical database. In fact according to a current implementation there are four options for the fourth field 414: "Continuous (and Ordinal)", "Discrete and Ordinal", "Discrete and Categorical", and "Ignore". The second drop down menu 414 is shown in its entirety in FIG. 6.

If an attribute is continuous it can be descretized in order to map continuous intervals into bins. An attribute that is already discrete, can also be subjected to further discretization to group values into bins, if the user prefers. "Discrete and Categorical" attributes are not amenable to discretization. If the user specifies that an attribute is to be ignored, it will not be included in further processing by the data mining software 100. Referring again to FIG. 4, a fifth field 416, which is applicable to quantitative attributes, includes a third drop down menu that is used to specify what type of discretization is to be used, e.g., fixed width bins or adaptive, etc. The third drop down menu 416 is shown in FIG. 7. According to a current implementation, the options for discretization are "Auto Entropy Method", "Fixed Total Bin Number", "Fixed Interval Value" and "Manual Split Values". The "Fixed Interval Value" results in approximately equal range bins. The "Fixed Total Bin Number" results in a specified number of bins with approximately equal bin size. The "Auto Entropy Method" invokes a known automatic discretization method.

If the user selects the "Manual Split Values" a dialog box 800 shown in FIG. 8 will be opened. The dialog box 800 includes a first text box 802 in which the user can type bin bounds that are to be used in discretization. After typing a value in the first text 802 actuating an "Add Value" button 804 will confirm the bound which will then appear in a second larger text box 806. A previously entered bound can be deleted using a delete button 808. An "OK & Close" button 810 is used to conclude manual input of bounds, and a "Cancel" button 812 cancels user input in the dialog box 800.

Referring again to FIG. 4 a sixth field 418 is multipurpose. In the case of quantitative attributes the sixth field 418 presents editable default parameter values for the chosen discretization method, i.e., the minimum bin data count for adaptive discretization, the number of bins for fixed total bin discretization, the range (interval) value for fixed interval value discretization. An upper bound defining a lower bin and a lower bound defining an upper bin can also be included in the sixth field 418. A dialog box (not shown) can be used to collect information for the sixth field 418. For non-quantitative attributes, the phrase "Discrete and categorical" appears in the sixth field 418 to confirm that the attribute is not quantitative. In FIG. 1 in block 112 quantitative attributes are discretized according to user specified methods. In discretization multiple values are collected into a set of bins. The values in one such "bin" can exhibit certain order, or can have no particular order. For example "red" and "pink" are grouped into "warm color", in this case, the red and pink have no special order. On the other hand if age 20, 21 and 23 are grouped into a single bin for the "early twenties", then the values 20, 21, and 23 have order.

Referring again to FIG. 4, a seventh field 420 is used to identify symbols in the values of the attribute that are to be ignored or treated as missing values. These symbols mean that the particular data is not available, not appropriate, or noise. In a current implementation, the data mining software will treat these symbols as a special attribute value. An eighth field 422 labeled "Processed Values" summarizes the distribution of attribute values for the attribute. For quantitative attributes the intervals assigned to each bin are shown along with the data count and the percentage of the data that fell in each bin. For non-quantitative attributes the count and percentage for each value of the attribute are shown. A ninth field 424 labeled "Raw values" shows the actual values of the attribute read from the data file(s).

Thus by editing each column in the top area 402 the user can finish entering in all the information about the data that data mining software 100 needs. If the user needs to find a particular attribute among many, rather than manually using the horizontal scroll bar 404 the user can search for the attribute name using a search box 426. The user can type in part of the name, and the matching attribute names and their locations will be shown in list box 432. The user can click the attribute in the list box 432, and the horizontal scroll bar 404 will automatically scroll to show the clicked (selected) attribute.

Figure 9:
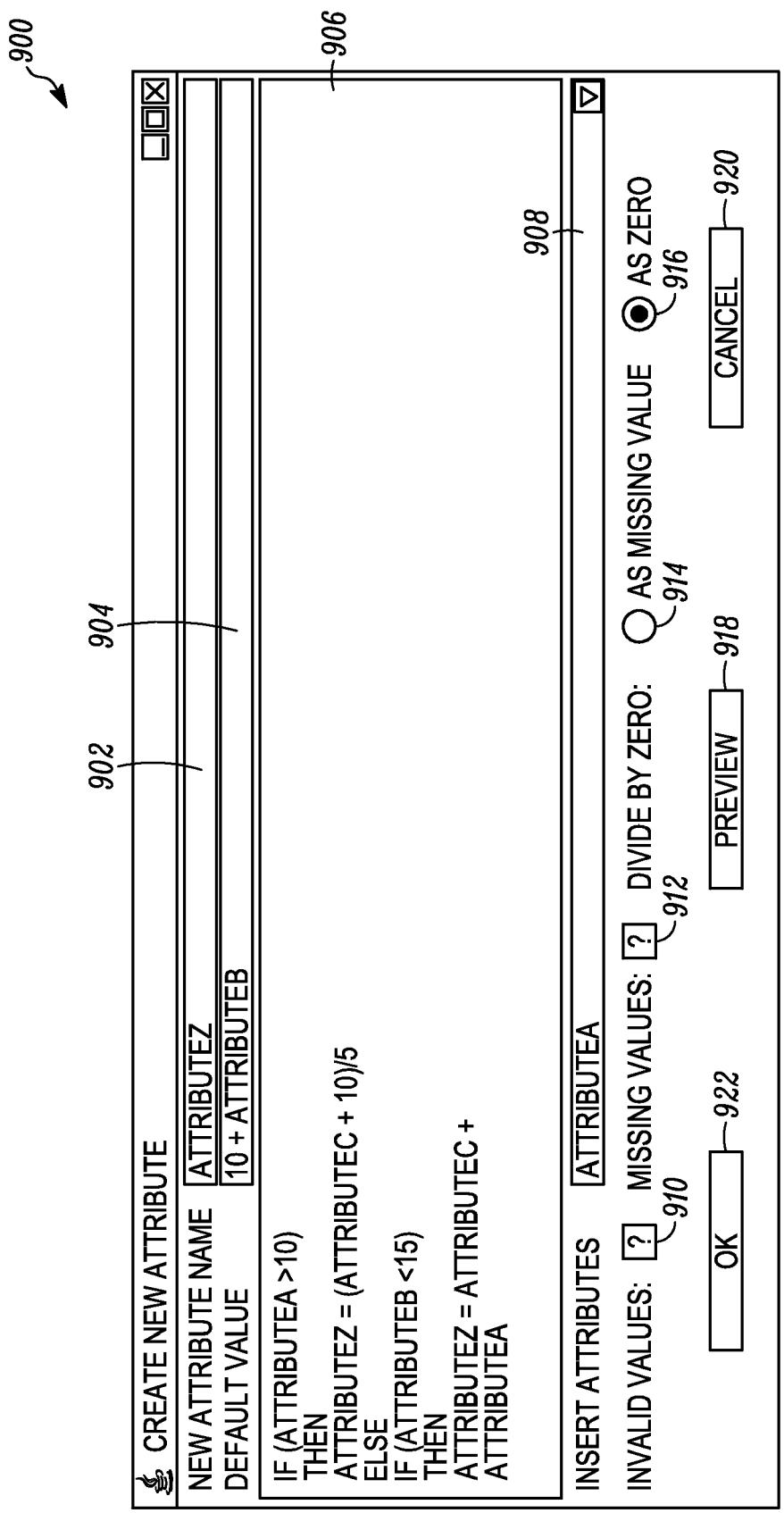

In some cases a user may want to create a new attribute. The new attribute can be a function of one or more attributes that exist in the data file and user specified constants. For example, a new attribute could be an existing attribute squared, or a quotient of two existing attributes. The definition of a new attribute can also include conditional statements, e.g., an IF . . . THEN . . . ELSE construct. Specific formulas that are appropriate creating new attributes are application specific and can be defined by users of the data mining software based on knowledge of their specific field. A "Create Attribute" button 428 will bring up a create new attribute dialog 900 shown in FIG. 9 which allows the user to define a new attribute. The dialog box 900 has a first text box 902 in which the user can type in a name for the new attribute. A second text box 904 is used to enter a default value for the new attribute. The default value can be a constant or an expression in terms of one or more other attributes. A third text box 906 is used to enter a non-default function defining the new attribute in terms of other attributes, constants. As shown in FIG. 9 the expression defining the new attribute can include an IF . . . THEN . . . ELSE conditional construct. A pull down menu 908 that lists existing attributes facilitates insertion of existing attributes in the new attribute's definition. An "Invalid Value" field 910 allows the user to enter an attribute value that is substituted for invalid values of the new attribute. Invalid values will arise when values of attributes used in the definition of the new attribute are invalid. Similarly, a "Missing Value" field 912 allows the user to enter in a value to be used in cases that the new attribute value is undefined because a value of an attribute in the definition of the new attribute is missing. A first radio button 914 is used to specify that when a divide by zero error occurs the value specified in the "Missing Value" field should be used for the new attribute. A second radio button 916 is used to specify that when a divide by zero error occurs the value of the new attribute will be set to zero. When the user actuates a "Preview" button 918 a new attribute preview window 1000 shown in FIG. 10 will be brought up. The window 1000 includes a spreadsheet-like presentation 1002 of values of the new attribute along with values of the attributes used to define the new attribute. Each column in the spreadsheet like presentation 1002 is for one of the attributes with a last column including values of the newly defined attribute. An "OK" button 1004 in the preview window 1000 closes it. A "Cancel" button 920 of the create attribute dialog box 900 cancels user action, and an "OK" button 922 concludes the user's process of defining a new attribute. After a new attribute is created, it will appear with other attributes in the top area 402 shown in FIG. 4. The user can then adjust control settings for the new attribute in the third GUI window 400 in the manner described above.

A log box 434 of the third GUI window 400 is used to report progress in processing. A cancel button 436 is used to cancel user actions in the third GUI window 400. A previous button 438 returns the user to the second GUI window 300 and a next button 440 brings the user to a fourth GUI window 1100.

Figure 11:
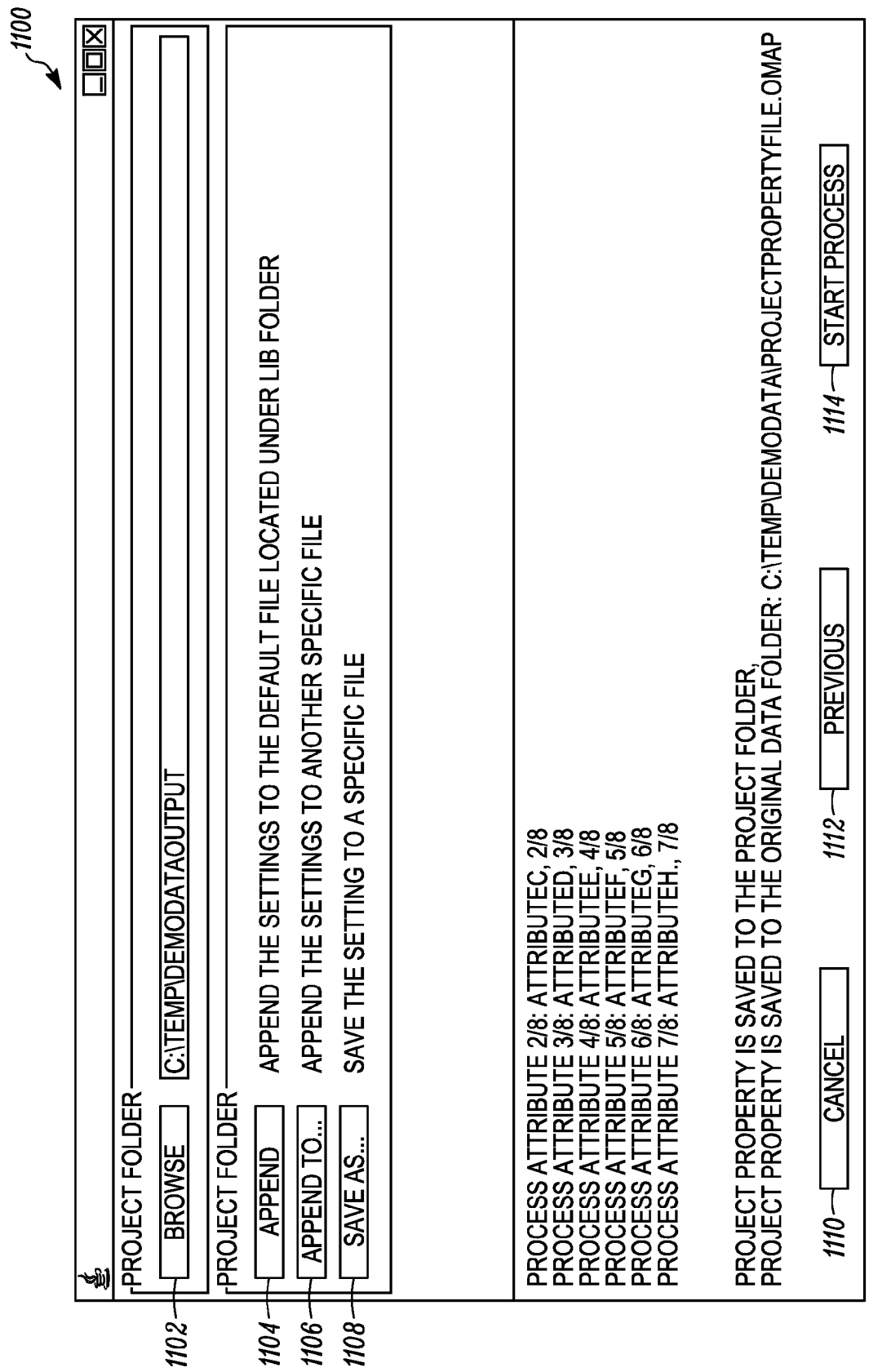
FIG. 11 is a fourth window of the data mining software, used to specify files for saving processed data and project settings for a data mining project.

Referring to FIG. 11 the fourth GUI window 1100 is shown. A "Browse" button 1102 of the fourth GUI 1100 is used to open a file directory navigation window for specifying a project folder in which to save the data processed by the data mining software 100. Alternatively, the data can be saved to a database, or saved to a network connection. An "Append" button 1104 is used to append settings for the data mining project, i.e., the information entered in the first three GUI windows 200, 300, 400 to a default file. The "Append To" 1106 button brings up the file browser so that the user can specify another file to which to append the settings. A "Save As" button 1108 allows the user to save the settings in a new file. A "Cancel" button 1110 cancels user input in the fourth GUI window 1100, a "Previous" button 1112 returns the user to the third GUI window 400 and a "Start Process" button 1114 will start the data processing and mining process, and generate various visualizations. The process may take some time depending on data size. After processing, the user will be presented with the GUI view shown in FIG. 12.

Referring again to FIG. 1 in block 114 the data mining software 100 counts the number of data records that meet all two-condition rules in which one of the conditions is a condition involving the class attribute. Block 114 may be completed after the user has finished using the first through fourth GUI windows 200, 300, 400, 1100 and associated dialog boxes 800, 900, 1000 and clicked the "Start Process" button 1114. The data mining software may also initially count other k-condition rules where k>2. The following notation can be used to specify a particular two-condition rule $A_k=a_{kj}$, $C=c_i$. In this notation $A_k$ is a particular $k^{TH}$ attribute other than the class attribute and $a_{kj}$ is a particular $j^{TH}$ value of the $K^{TH}$ attribute; C is the class attribute and $c_i$ is a particular $i^{TH}$ class value. The number of data samples that satisfy the two condition rule, referred to as the support for the rule is denoted $sup(A_k=a_{kj}, C=c_i)$, referred to hereinbelow also as a sample count. Note that after counting the counts for each two-condition rule, further retention and use of the counts is not restricted to those rules that meet imposed minimum support or confidence levels. Rather all counts are retained and utilized as will be described below. Retaining all the counts, regardless of support and confidence levels, allows meta-information referred to herein as "General Impressions" to be mined from the data as will be described below. The procedures for obtaining "General Impressions" make it possible for a human user to navigate large and very high dimension (e.g., two-hundred attribute) data sets. Moreover retaining all of the counts allows the rules to be presented to the user in context which allows the user to get an intuitive feel for the data. This approach of retaining all of the rules differs considerably from data mining approaches that attempt to adapt methods from pattern recognition. Such approaches, although varying considerably in their details, in general tend to aim at producing a very limited number of rules that can discriminate classes. While a limited number of rules which may involve many more than two conditions are readily parsed and evaluated by a computer they do not foster an intuitive understanding of the data by a human user.

In block 116 in FIG. 1 histograms based on the two-condition rule counts are displayed. For each histogram one attribute value (usually the class attribute value) is fixed and individual bars in the histogram correspond to different values of the remaining attribute (usually a non-class attribute) of a two condition rule.

In block 118 what the inventors have termed "General Impressions" are extracted from the data. As will be described below in more detail "General Impressions" are obtained by processing related sets of rules with certain types of formulas (specific examples of which are given below) to obtain different kinds of metrics and ranking and presenting histograms or rule cubes in order based on the values of the metrics.

Figure 12:
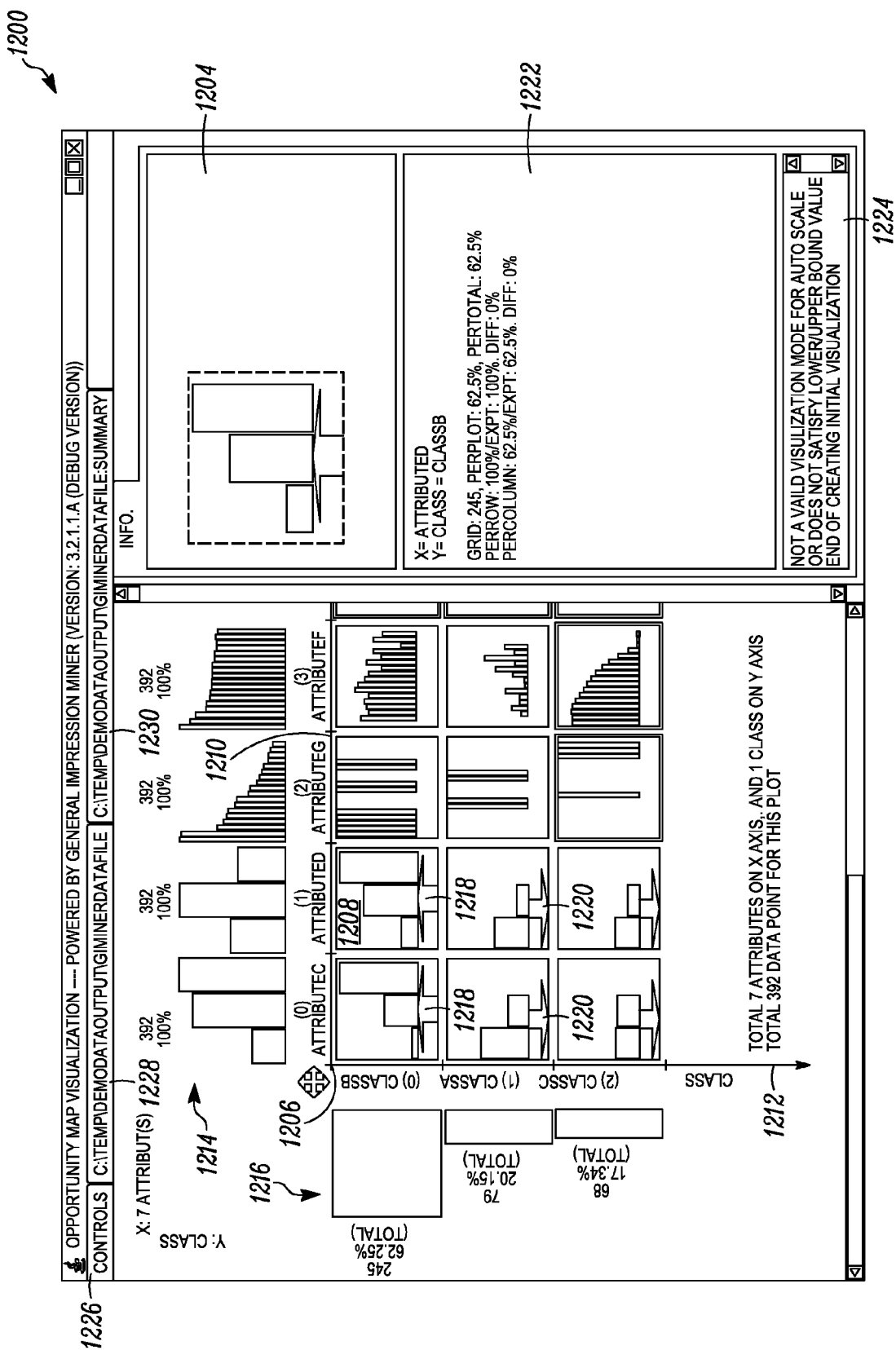
FIG. 12 is a fifth GUI window showing an arrangement of histograms generated by the data mining software after initially processing the data set.

FIG. 12 is a fifth Graphical User Interface (GUI) 1200 window showing an arrangement of histograms generated by the data mining software 100 after initially processing the data set. The GUI 1200 presents a high level view of the data being mined including information on all attributes and but also yields considerable detailed information to the user. The GUI 1200 of the data mining software 100 is able to show all the two-condition rules in context in a manner that facilitates rapid conveyance of salient information notwithstanding the great size and high dimensionality of the data being analyzed. As shown in FIG. 12 the fifth GUI window includes a left panel 1202 and a right panel 1204. In the left panel 1202 a plurality of histograms are arranged in a grid 1206. Each histogram is located in a grid square 1208 (or alternatively another area, e.g., a rectangle). The grid squares 1208 are arranged in a plurality of rows and a plurality of columns within the grid 1206. The number of rows is equal to the number of class attribute values (number of classes). All the rules for each class value appear in the same row of the grid 1206. As shown in FIG. 12 there are three classes and correspondingly three rows in the grid 1206. The number of columns in the grid 1206 is equal to the number of attributes $A_k$ other than the class attribute. All the rules for a given non-class attribute $A_k$ appear in the same column, i.e., a $k^{TH}$ column. Each grid square in each column includes a histogram and each bar of the included histogram represents one rule. In the $k^{TH}$ column each bar represents the count of a two-condition rule that involves the $k^{TH}$ attribute $A_k$ as well as the class attribute C (e.g., a two condition rule $A_k=a_{kj}$, $C=c_i$). Thus, for example the bars in the histogram in numbered grid square 1208 represent counts for all two-condition rules in which one condition is that the class attribute is equal to "ClassB" and the other condition is a condition on an attribute "AttributeD". Successive bars in the histogram in numbered grid square 1208 correspond to successive values of "AttributeD". For quantitative attributes, successive bars represent counts for bins created by discretization. Within each grid square the user is able to see a family of rules which are related in that they are rules for the same value of the class attribute and different values of the same non-class attribute.

Seeing all the rules, the user is able to spot trends quickly. Admittedly if there are a large number of attributes, for example over 200 in the mobile telephone application discussed above, it may be wearying, especially if the user is in a hurry, to look at 600 histograms (200×3 classes) in order to look for trends, but as discussed below the data mining software 100 has features for assisting the user in spotting important trends. Not only are rules in context within each grid square, but also rules for the same value of the non-class attribute but different values of the class attribute are horizontally aligned, i.e., one-above another. Such context allows the user to see what classes gain at the expense of others. This is especially useful in data mining applications with more than two classes (class attribute values). It is worth noting that the system does not restrict the use of Y-axis to representing the class attribute. It is possible to have other attributes on the Y-axis instead of the class attribute. In as much as the software 100 will function in a similar manner the following description addresses the most common situation in which the Y-axis is used for the class attribute.

The grid 1206 is edged by an X-axis 1210 that runs along the top of the grid 1206 and a Y-axis 1212 that runs down the left side of the grid 1206. A horizontal array of histograms 1214 is arranged above the X-axis 1210. The histograms in the horizontal array of histograms 1214 represent summations over all the class values. Each bar in each histogram in the horizontal array of histograms represents a summation over the class values with a fixed value of a non-class attribute. The bars in the horizontal array of histograms 1214 align with the bars in the grid 1210 having the same non-class attribute value.

A vertical array of bars 1216 extend to the left from near the Y-axis 1212. The vertical array of bars 1216 represent summations for each class value over the data set. For example in FIG. 12 it can be seen that 62.5% of all samples in the data set were in "ClassB", 20.15% in "ClassA" and 17.34% in "ClassC".

Figure 26:
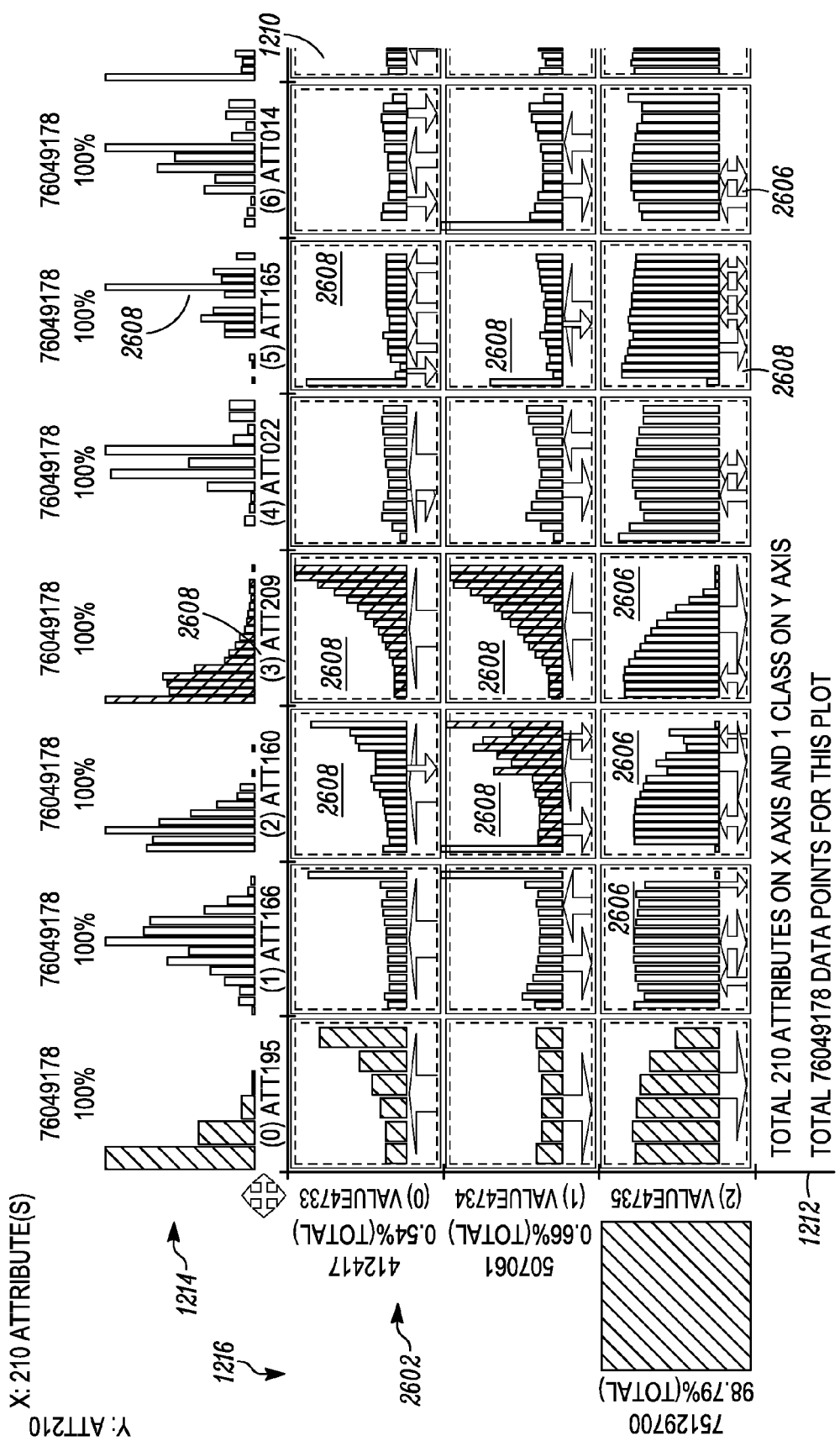
FIG. 26 is a view of the GUI showing histograms sorted by strength of increasing trends in one of three classes.

As will be explained further below, the data mining software 100 automatically discovers and determines the strength of trends in histograms. As shown in FIG. 12 an upward facing arrow 1218 is placed below sequences of bars in histograms in the grid 1206 that exhibit strong increasing trends, and a downward facing arrow 1220 is placed below sequences of bars in histograms that exhibit strong decreasing trends. The width of the arrows 1218, 1220 spans the range (from start to end) of the associated trends. The arrows 1218, 1220 are suitably differentiated by color, for example the upward facing arrows 1218 can be green and the downward facing arrows 1220 can be red. As shown in FIG. 26, in certain cases a single histogram may exhibit multiple trends in which case multiple arrows are shown to highlight the different trends. Note that it is possible that multiple arrows overlay with each other. For example, within a long up trend, there can be a small down trend. It is also possible to use saturation or brightness to distinguish "strong" trend from a "weak" trend, or the confidence value of the trend (see below). For example, a strong up trend can be in pure green color, while a weak up trend can be in light green color. Saturation (or brightness) of the color is calculated as proportional to the trend's confidence value, support value, support count, or any combination thereof.

The right hand panel 1204 is used to show an enlarged view of any grid square that the user selects e.g., using a mouse pointer. In addition to the enlarged view, the right panel 1204 includes a first text box 1222 that lists information pertaining to the enlarged grid square including: the attribute names and their values, data counts of the grid square, data percentage as to the data in the grid and as to all the data, percentage of data as to the row and column where the enlarged grid square resides. If there are data constraints (such as in FIG. 20), the text box 1222 will also show the data constraints, and all the above data counts and percentage with and without the data constraints. If scaling (discussed below) is used, the text box 1222 will also show the scale factors used for the grid square 1208, for the row and column where in the grid 1206 the enlarged grid square resides. Alternatively, if the user points the mouse to a row, or point the mouse to a column, the system will not show the enlarged view of the pointed row or column. However, the corresponding information in 1222 will still be shown. The user selects a column by pointing the mouse above X-axis 1210, and selects a row by pointing the mouse at the left of Y-axis 1212. Different font colors or font styles are used to highlight certain information. A second text box 1224 in the right hand panel 1204 serves as a log panel, which can be used to show error information, informative hints, or help information.

Note that the fifth GUI window 1200 has three tabs including a "Controls" tab 1226, a second tab 1228 that is marked with a path to a data mining project file and is the active tab in FIG. 12, and a "Summary" tab 1230 marked with the same path followed by the "Summary". The "Controls" tab 1226 (not shown) has a button and menu for starting a new project and bringing up the first GUI window 200 and another button and menu for opening an existing project.

Figure 13:
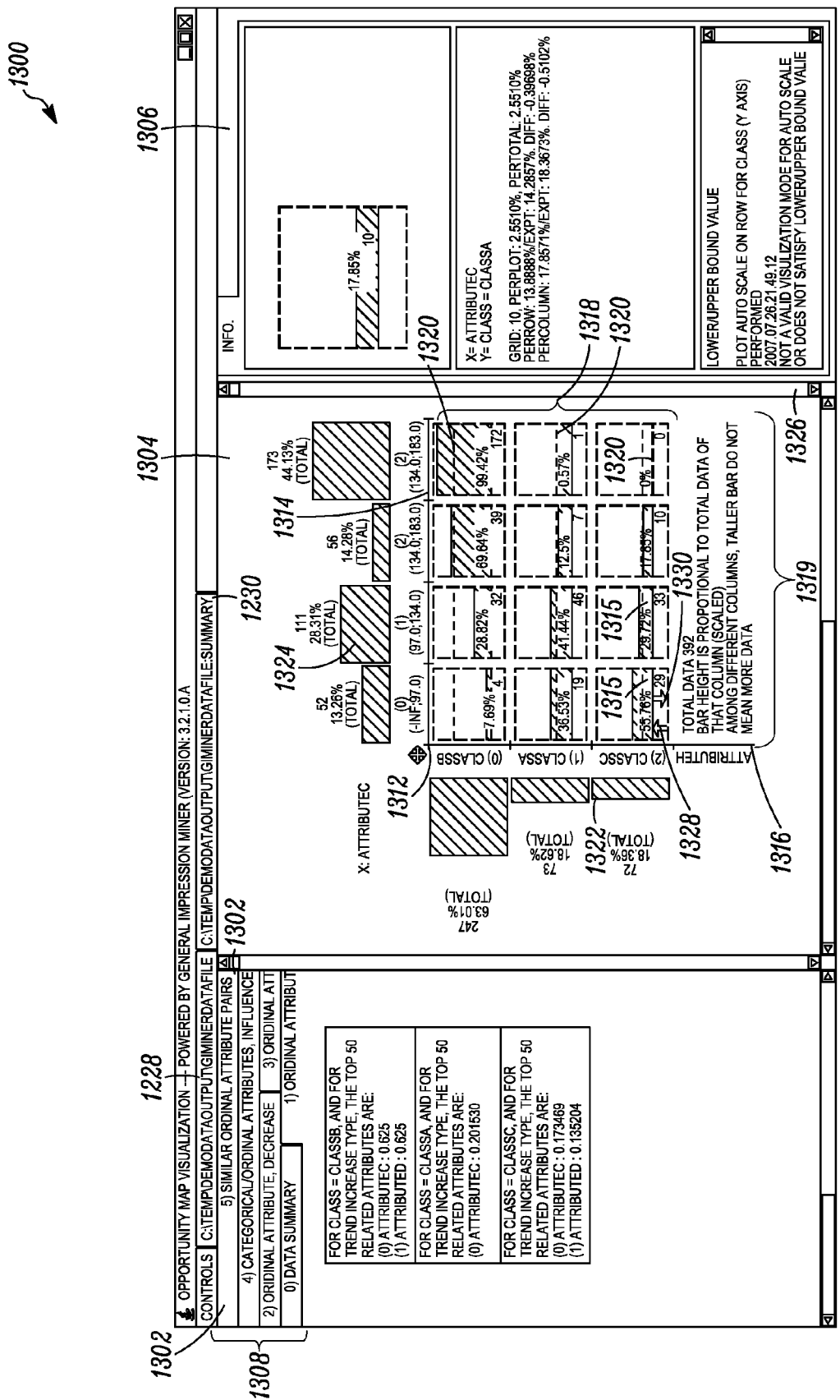
FIG. 13 is another view of the GUI of the data mining software showing a side panel that has several tabs that highlight salient information ("General Impressions") extracted from the data set, a center panel that presents corresponding rule cubes, and a right panel that shows detailed information in response to mouse pointer selection.

The "Summary" tab 1230 brings up a sixth GUI window 1300 shown in FIG. 13. The sixth GUI window 1300 has a left panel 1302, a center panel 1304 and a right panel 1306. The left panel 1302 has many tabs 1308 the specific functions of which will be described below. Selecting each of the tabs 1308 brings up corresponding content in the center panel 1304. The tabs access some of the "General Impression" data mining features of the software 100.

A first tab 1310 of the left panel 1302 which is visible in FIG. 13, and is also shown in FIG. 14 is labeled "Ordinal Attribute, Increase". A second tab 1502 shown in FIG. 15 is labeled "Ordinal Attribute, Decrease" and a third tab 1602 shown in FIG. 16 is labeled "Ordinal Attribute, Stable". Each set of related rules having a common class value constraint and differing values of the same non-class attribute, i.e., each set of two-condition rules that are represented as histogram in one grid square 1208 of the grid 1206, is analyzed by the data mining software 100 to determine what trends are exhibited. Identifying trends in large high dimensional data sets is an important task that the data mining software 100 is able to perform for users. Trends are often meaningful to experts in various fields that could potentially benefit from data mining software.

As a first task in analyzing trends, the data mining software, seeks to identify trends that exist in each set of related rules. The data mining software 100 is programmed to require that trends span at least a minimum number of consecutive attribute values. The minimum trend length is suitably set to a value between 2 and 10, e.g., 3 in a current implementation. The sequence of counts within a trend need not be strictly monotonic, exceptions are permitted. Starting at the first attribute value a sequence of N attribute values is examined to determine how many "reversals" the sequence includes. N is initially equal to the minimum trend length. In looking for an increasing trend, a reversal exists where a count for a later attribute value in the sequence exceeds a count for an earlier attribute value. In notation a reversal exists where $v_i < v_j$ for $i < j$ and where i and j designate attribute values and $v_i$ and $v_j$ designate respective counts. By way of example, for three consecutive attribute values (bins) labeled 1, 2 and 3 the reversal test would be performed looking at not only sample count 1 vs. sample count 2 and sample count 2 vs. sample count 3 but also sample count 1 vs. sample count 3. Thus as N increases the possible number of reversals increases rapidly, i.e., the total number of possible reversals is $N(N-1)/2$. After counting the number of reversals, the number is compared to threshold in a stored statistical table that is part of the data mining software 100. The threshold depends on N and a preprogrammed required certainty of a trend existing. The preprogrammed certainty suitably is a value between 90% and 100%, e.g., 95% in a current implementation. The above described reversal test is known, and published statistical tables for the reversal test can be employed. See for example Bendat J. Persol A. *Random data: analysis and measurement procedures* Wiley-inter science. 2005.

If the initial sequence is found to satisfy the reversal test then the sequence length N is increased by one and the reversal test repeated. Processing continues in this manner until the last attribute value is reached, in which case the trend will have been found to cover the entire range of attribute values, or until the trend does not meet the required certainty, at which point the trend will be considered terminated.

If on the other hand the initial sequence does not satisfy the reversal test, then the starting point of the sequence is advanced by one position and the foregoing process is repeated. The counts for values of a single attribute may exhibit multiple disjoint trends over its range of values. When a trend terminates the above described process will continue to be applied to remaining attribute values beyond the termination of the trend in order to seek out additional trends. The above described processes are applied to find both increasing and decreasing trends. Ranges of attribute values that exhibit neither increasing nor decreasing trends but rather exhibit sample count stability are also identified. For a range of attribute values to be qualified as exhibiting stability, the sample to sample variance of values must be below some programmed variance limit, otherwise the variation is considered by the data mining software 100 to be merely random.

Once ranges of attribute values that exhibit increasing trends and decreasing trends have been identified the data mining software 100 computes a confidence for each increasing and decreasing trend. One suitable, but certainly not the only, formula for the confidence of increasing and decreasing trends, that can be used is:

$$Confidence_{UT} = 1.0 - \frac{Abnormal\_data}{Support_{UT}}$$

where, $Support_{UT}$ is the sum of the data count for all rules that the trend spans; and Abnormal_data is the data count of rules that violate the reversal test, i.e., sample counts for attribute values that violate monotonicity.

The preceding formula for the confidence applies to a single trend within the range of attribute values. Such a single trend is referred to herein as a "unit trend". As stated above, there may be multiple disjoint unit trends of the same or different type within the range of values of an attribute. In some cases an increasing (or decreasing) trend might break off for a few attribute values, be replaced by a decreasing (or increasing) trend, stability or random variation and then pick up again. Accordingly it is useful to use a formula that agglomerates the confidence of unit trends of a particular type (i.e., increasing, decreasing or stable) over the entire range of values of an attribute. The following formula may be used for this purpose:

$$TV(A_i, b_l, c_k) = \sum_{j=1}^{t} Support_{UT_j} * Confidence_{UT_j}$$

where, Ai is a particular attribute; bl is a particular trend type, e.g., stable, increasing or decreasing; ck specifies a particular class; and the summation index j refers to successive unit trends.

The latter formula is used by the data mining software 100 to quantify each type of trend for each histogram corresponding to class value and a non-class attribute, and then to rank the non-class attributes for each class according by trend strength. Referring again to FIG. 13 and FIG. 14 the left hand panel 1310 lists some information that results from quantifying the trend strength exhibited in each histogram and ranking the non-class attributes accordingly. In the left panel 1310 for each value of the class attribute, non-class attributes are listed in sorted order according to the trend strength (TV) as determined by the preceding formula. As shown 50 non-class attributes exhibiting the strongest trends will be shown, but this number may be varied. Stable ranges of attribute values are identified as ranges of attribute values that have not been identified as exhibiting increasing or decreasing trends and in which the standard deviation is below some preprogrammed limit. In order to rank stable trends a formula that is a decreasing function of the variance can be used to quantify the stability.

When the user selects (e.g., mouse clicks) one of the attributes listed in the left hand panel, a rule cube 1312 for that non-class attribute and the class attribute will be shown in panel 1304. The rule cube 1312 is edged by an X-axis 1314 and a Y-axis 1316. The rule cube 1312 has a plurality of grid squares 1313 (a central one of which is numbered) arranged in a plurality of rows 1318 including one for each value of the class attribute and a plurality of columns 1319 including one for each value of the selected non-class attribute. Each grid square 1313 includes a bar 1315 (one of which is numbered) that extends vertically from a certain baseline height of its respective grid square 1313. Each particular grid square can be identified by a pair of indexes (i,j) (matrix indexes) where the index i identifies a row of the particular grid square and the index j identifies a column of the particular grid square. The bar 1315 in each (i,j)$^{TH}$ grid square 1313 has a height that is proportional to the fraction of samples that have the attribute value corresponding to the j$^{TH}$ column that also have the attribute value (e.g., class value) corresponding to the i$^{TH}$ row. Horizontal lines 1320 extending across each histogram denote a prior probability that considers only the sample count for each Y-axis attribute (e.g., class attribute) value. Thus, the same horizontal line 1320 extends through each row 1318 of the rule cube 1312. To the left of the Y-axis 1316 a side-ways histogram 1322 includes a bar for each row of the rule cube 1312. Each bar in the side-ways histogram 1322 represents a count for each Y-axis attribute (e.g., class attribute) value. Each horizontal line 1320 has a height that is proportional to a height of a corresponding bar in the side-ways histogram 1322. Similarly, above the X-axis 1314 an additional histogram 1324 includes a bar for each column of the rule cube 1312, i.e., for each value of the selected Y-axis (e.g., non-class) attribute. As shown in FIG. 13 counts and percentages are printed on or near each bar of each histogram.

Rather than clicking an individual attribute in the left panel 1302, the user can click "top 50" (or another user selectable number) in which case the same presentation as shown in FIG. 13 in the center panel 1304 for one non-class attribute will be generated one above another for all fifty (or other user specified number) attributes. In this case the user can use a vertical scroll bar 1326 to see all of the rule cubes.

When the user clicks on a particular histogram bar shown in the center panel 1304 an enlarged view of the histogram bar will be shown in the right panel 1306 along with corresponding numerical data.

The same type of presentation will be generated in the center panel 1304 when using the "Ordinal Attribute, Decrease" tab 1502 shown in FIG. 15 and when using the "Ordinal Attribute, Stable" tab 1602 shown in FIG. 16.

Note that the preceding formula quantifies trends within a particular histogram, e.g., a histogram in one of the grid squares of grid 1206 in FIG. 12, and therefore the class attribute has one particular value. If the class attribute value depends strongly on a particular non-class attribute value, then the histograms for the same non-class attribute but different classes may vary in opposite senses, however initially it is not known which histograms will exhibit increasing trends and which decreasing trends. Accordingly, in looking for trends of a particular type (e.g., increasing, decreasing) it is useful to have a metric that agglomerates the strength of trends of particular type over the class value. One suitable formula is:

$$Trend(A_i, b_l) = \sum_{k=1}^{m} TV(A_i, b_l, c_k)$$

Although not shown in the tabs 1308 alternatively rankings of attributes based on the preceding formula can be output by the software 100.

FIG. 17 shown a fourth tab 1702 labeled "Categorical/Ordinal Attributes/influence Values". Selecting the fourth tab 1702 shows the user information about non-class attributes that have strong discriminative power in respect to the class attribute. Recall that in FIG. 13 horizontal lines 1320 were shown to represent the prior probability for each bar height based only class value frequencies, thus because "ClassB" shown in FIG. 13 accounted for 62.5% of the data, the horizontal line 1320 for the first row 1318 of the rule cube was at a level of 62.5%. If there is no correlation between the value of a particular non-class attribute and the class value, then counts for all values of the non-class attribute would be expected to be at the prior probability level. One can quantify the degree of relation between non-class attribute value and the class attribute in a variety of ways. To start the inventors have applied the following formula in the data mining software 100:

$$DE(A_i = a_{ij}, c_k) = |Conf_{Obs}(A_i = a_{ij}, c_k) - Conf_{Expt}(c_k)|$$

where, DE stands for degree of exception; $A_i$, as before, is a non-class attribute, $a_{ij}$ is a value of the non-class attribute; $c_k$ is a value of the class attribute; $Conf_{Expt}(c_k)$ is the prior probability of class $c_k$ and $Conf_{obs}(A_i=a_{ij}, C=c_k)$ is defined as the confidence of the two-condition rule $A_i=a_{ij}$, $C=c_k$ and is given by:

$$Conf_{Obs}(A_i = a_{ij}, \ldots, A_n = a_{nm} \to C = c_k) =$$

$$\frac{sup(A_i = a_{ij}, \ldots, A_n = a_{nm}, C = c_k)}{\sum_{j=1}^{|dom(C)|} sup(A_i = a_{ij}, \ldots, A_n = a_{nm}, C = c_j)},$$

Note that the preceding formula is a general formula that applies to n-condition rules, where n can be greater than two. Initially only one non-class attribute is used in the formula, however as will be described below n-condition rules are used in the data mining software to allow the user to "drill down" into the data.

The degree of exception can then be summed over all of the class values in the following formula:

$$DP(A_i = a_{ij}) = \sum_{k=1}^{m} DE(A_i = a_{ij}, c_k) * w_k$$

where DP stands for discriminative power; and $w_k$ is a default (e.g., unity) or user specified weight for each class. A user may wish to use a non-unity weight to compensate for imbalances in the total number of samples in each class, or to emphasize or de-emphasize the relative importance of different classes.

The preceding formulas for DE and DP are focused on a single non-class attribute value $a_{ij}$. In order to obtain a metric of the discriminative power of a non-class attribute, discriminative power for a single value of the non-class attribute is agglomerated over all values of the non-class attribute. One way to do this is using the following formula:

$$DP_{\Sigma}(A_i, c_k) = \sum_{j=1}^{r} sup(A_i = a_{ij}, c_k) \times DE(A_i = a_{ij}, c_k)$$

where $sup(A_i=a_{ij}, c_k)$ is the count of each two-condition rule $(A_i=a_{ij}, c_k)$.

The discriminative power is a synonym for "Influence Value" used in the fourth tab 1702 shown in FIG. 17. The data mining software applies the preceding formula to find the discriminative power of all of the non-class attributes, and then the non-class attributes are ranked according their discriminative power. Note that in the fourth tab 1702 ordinal (quantitative) and categorical non-class attributes are ranked separately. Alternatively, ordinal attributes and categorical attributes can be ranked together. When the user selects the fourth tab 1702 of side panel 1302 the user will receive the two rankings of non-class attributes. Clicking on one of the attributes or the word "all" shown in fourth tab 1702 will cause corresponding rule cubes to be displayed in the center panel 1304. In the case that "all" is clicked the rule cubes will be arranged vertically and the user will then be able to scroll the center panel 1304 in order to see each one. Thus, the data mining software 100 is able to identify attributes that have the greatest discriminative power and present those to the user in a format that is intuitively understandable. This is highly valuable in as much as it allows the user to quickly obtain useful information from large high dimensional data sets.

Another way that the data mining software 100 can extract useful information from data sets is to analyze the data in order to find different non-class attributes that vary in the same or opposite senses. Such information can lead to discovery previously unknown relations between attributes. For example, previously unknown cause and effect relationships may be discovered or it may be learned that values of two attributes are determined by a common underlying "driving force". One way to quantify the degree of relation between to attributes is using the following formula:

$$\frac{\sum_{Class\ Ci} \sum_{Trend\ Type\ bl} \sum_{Unit\ Trend\ UT_{(bl,ci)}} Min(Support(UT_{(A,bl,ci)}), Support(UT_{(B,bl,ci)}))}{Support(c_i)}$$
$$\overline{Total\ Data\ Count}$$

Figure 18:
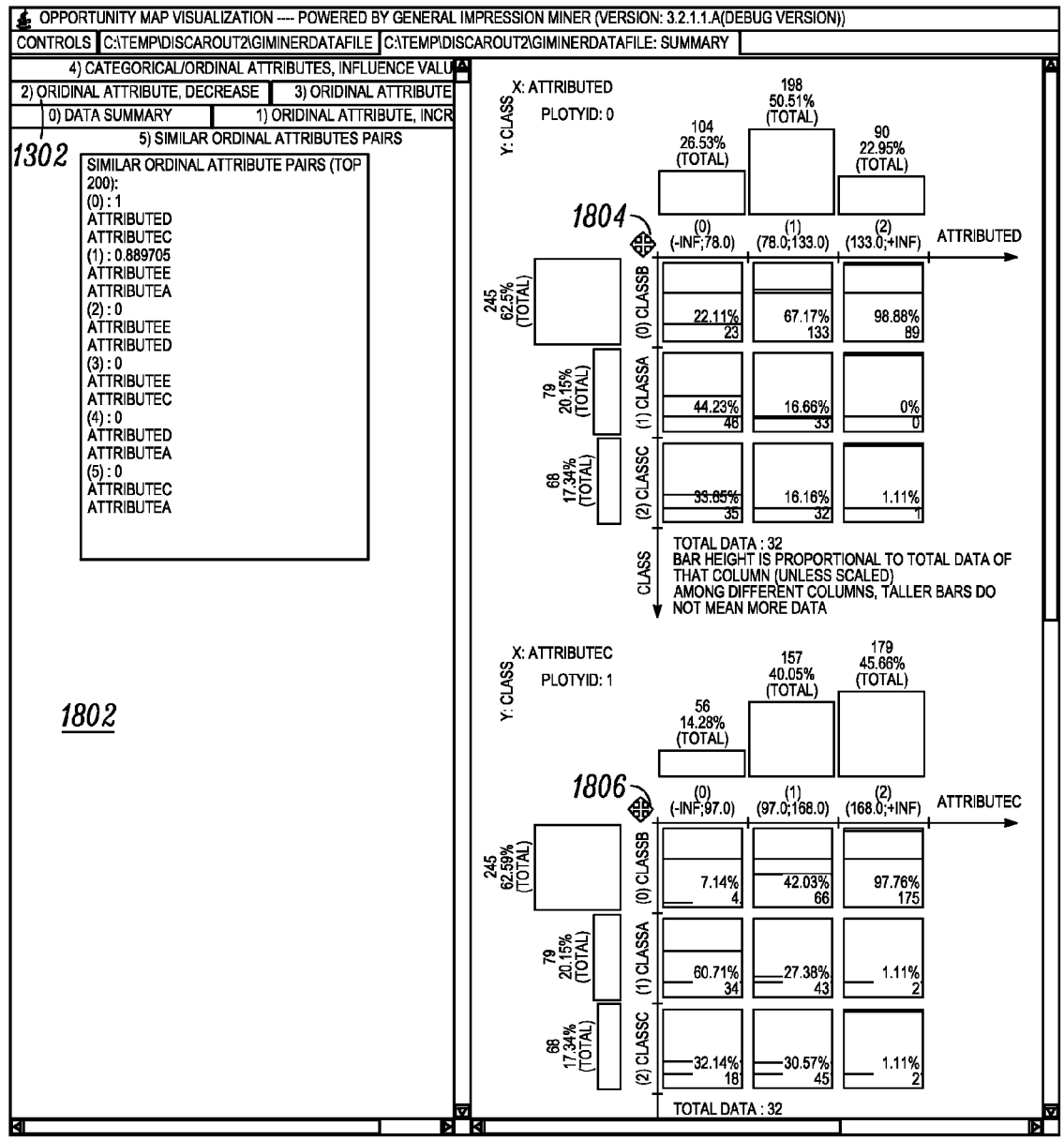
FIG. 18 is a second view of the GUI shown in FIG. 13 showing content under a fifth tab related to rule cubes that exhibit similar trends and a center panel displaying rule cubes found to exhibit similar trends.

This formula is evaluated for each pair of non-class attributes A, B. Alternatively, another non-class attribute is used in the formula in place of the class attribute. The results obtained from evaluating the formula are then ranked. Pairs of attributes can then be presented to the user. FIG. 18 is another view of the window 1300 shown in FIG. 13 showing a fifth tab 1802 of the left side panel 1302 and another view of the center panel 1304 with different content than shown in FIG. 13. The fifth tab 1802 lists similar pairs of attribute in order according to the metric of similarity given by the preceding formula. When a user selects (e.g., mouse clicks) one of the pairs in the side panel 1802 a pair of rule cubes 1804, 1806 for the selected pair appears in the center panel 1304 along with additional histograms above and to the side as described above in connection with FIG. 13. Viewing the center panel 1304 the user is then able to observe the similarity of pairs of attributes. Alternatively, GUI controls that allow the user to bring up the lowest ranked pairs of attributes can be provided. Attributes that vary in an opposite sense as a function of attribute value will have low values of the metric given by the preceding formula. Alternatively, more than two attributes can be grouped into a similarity group using the preceding formula. Using the above formula as the distance function between two attributes, three or more attributes can be judged as similar, or within a similarity group. A clustering algorithm can be used for this purpose.

Figure 19:
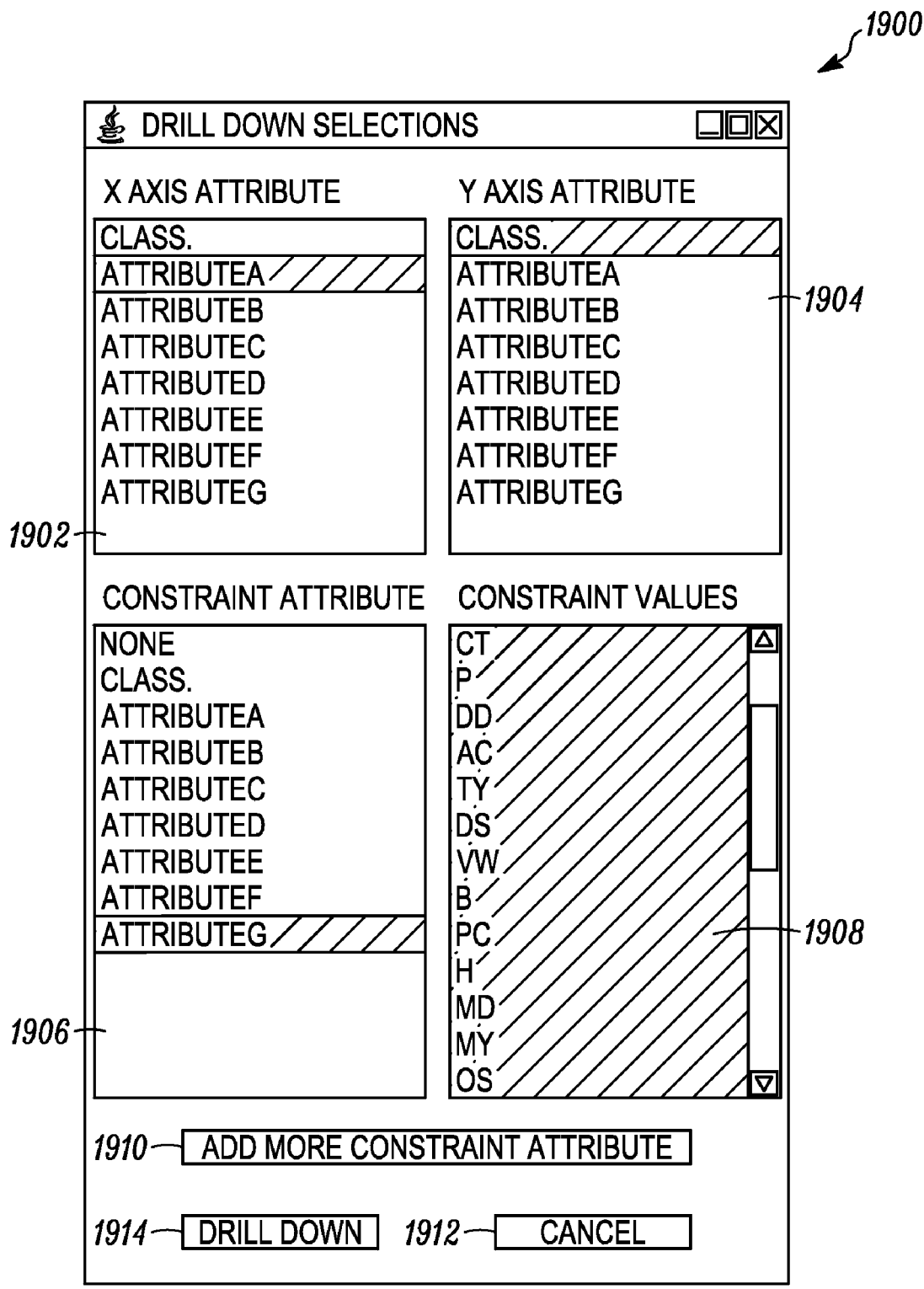
FIG. 19 is a dialog box that allows the user to "drill down" into a large data set by accepting user specification of constraints.

FIG. 19 is a dialog box 1900 that allows the user to "drill down" into a large data set by specifying constraints. In order to drill down the user selects an X-axis attribute from a first select list 1902 and a Y-axis attribute from a second select list 1904. Then the user can select one or additional attributes to be used in defining constraints from a third select list 1906. For each selected constraint attribute, all of the possible attribute values will appear in a fourth select list 1908. The user can then select (e.g., highlight with the mouse) one or more of the attribute values. After selecting values for each constraint attribute, the user can then use an "Add More Constraint Attribute" button 1910 and then repeat the selections in the third select list 1906 and the fourth select list 1908 to impose additional constraints. Each constraint can require that a constraint attribute have one specified value or that the constraint attribute have one of multiple selected values. A cancel button 1912 allows the user to cancel actions in the dialog box 1900. However, if the user is satisfied with the entered constraints the user can actuate a "Drill Down" button 1914.

The data mining software 100 can be configured to automatically count all two-condition rules after the user has entered project information using the GUI windows shown in FIGS. 2-11. (Recall that only two-condition rules involving the class attribute are needed for the presentation in FIG. 12) However, if this is not the case, then in response to the user's actuation of the "Drill Down" button, the software 100 will count the number of samples in the data set that satisfy each two-condition rule involving the attribute selected for the X-axis and the attribute selected for the Y-axis. In notation we can describe such rules as $[A_X=\{a_X\}, A_Y=\{a_Y\}]$ where $A_X$ is the attribute select for the X-axis, $\{a_X\}$ is a set of selected alternative attribute values for $A_X$. The notation for the Y-axis is similarly defined. Additionally, the data mining software 100 will perform the same counting but limited to samples in the data set that satisfy the user specified constraints.

Figure 20:
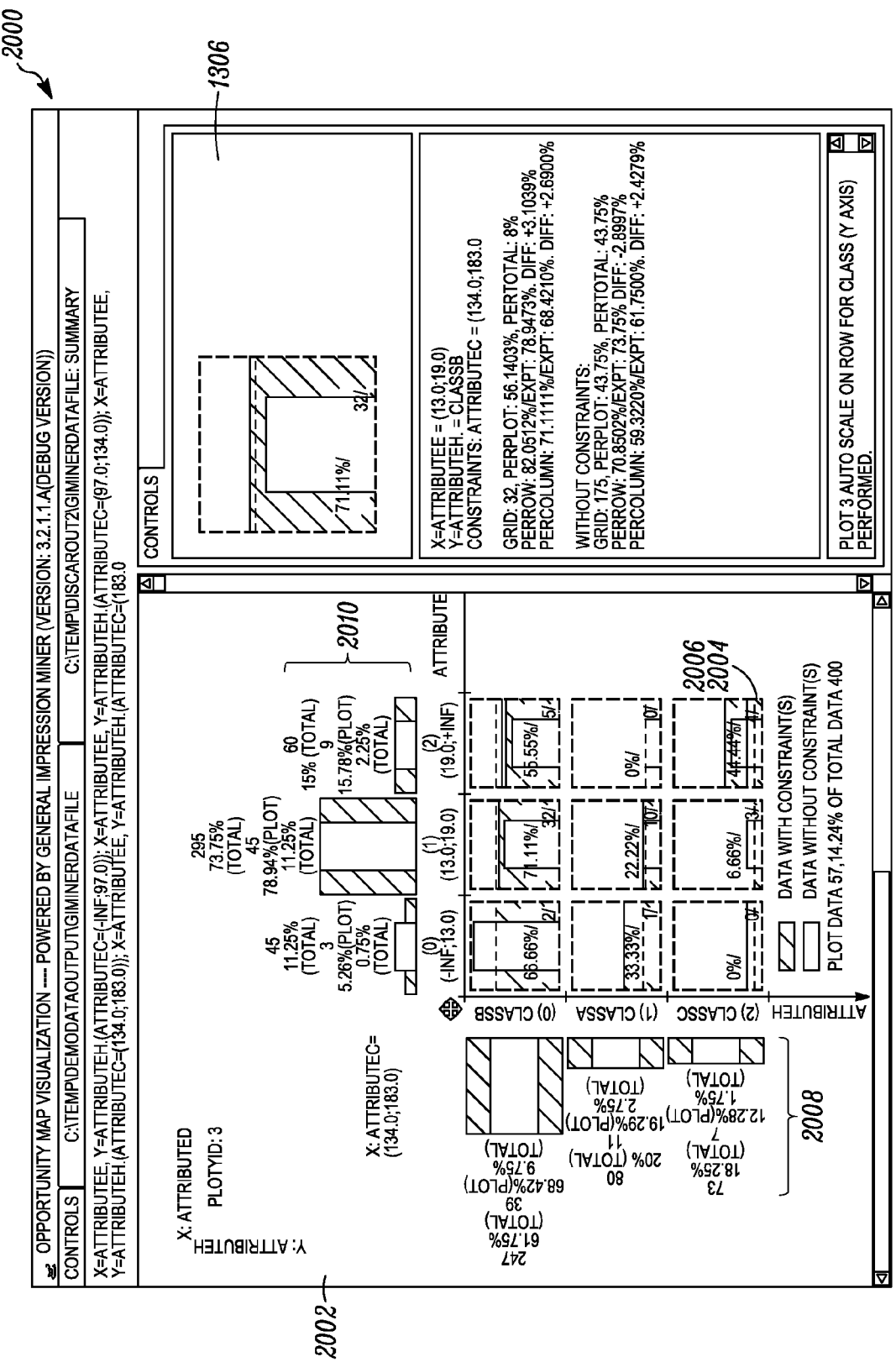
FIG. 20 is a view of the GUI showing two superposed rule cubes with and without a particular user specified constraint.

FIG. 20 is a view of a GUI window 2000 including a left panel 2002 showing two superposed rule cubes 2004, 2006 with and without the user specified constraint(s). Aside from the superposition the layout of graphical elements in the left panel 2002 in FIG. 20 is similar to the layout of the center panel 1304 shown in FIG. 13. Included in FIG. 20 are two superposed sideways histograms 2008 and two superposed additional histograms 2010 analogous to 1322 and 1324 in FIG. 13. Narrow bars of a first of the superposed rule cubes 2004 and in the additional histograms 2008, 2010 reflect rule counts without the user defined constraint, while wider bars of the second of the superposed rule cubes 2006 reflect rule counts with the user defined constraint. Alternatively, the use of wide and narrow bars is reversed. The wide and narrow bars reflecting counts with and without the user defined constraint are also distinguished by color. Distinction by color is especially useful to prevent occultation if the narrow bars happen to be shorter than the wide bars. A right panel 2012 of the GUI window 2000 shows an enlarged version 2014 of a set of superposed bars that the user has selected (e.g., with a mouse pointer) in the left panel 2002 and associated textual information.

The capability described above with reference to FIGS. 19-20 allows users visually explore the effect of various data constraints. One example of the use of drilling down in a data set would be to clarify differences in causes of a particular disease in senior citizens and the general population which would be distinguished by addition of a constraint on an age attribute. Another example would be uncovering deficiencies in a particular mobile telephone model identified by a constraint on a model attribute.

As described above constraints can be applied to define rule cubes which are then generated as visualizations. Constraints can also be applied to the high level view of many rule cubes shown in FIG. 12. To do so the user need only enter constraint attributes and associated values using a window similar to 1900 (not shown) but lacking select boxes 1902, 1904, which are not needed for constraining the high level view. The constraints thus specified will also apply to the results obtained when using the tabs 1310, 1502, 1602, 1702, 1802 of the left panel 1302 of the GUI window 1300 described above. Thus, for example, the user can study the difference between trends that appear with and without the user specified constraint and the discriminative power of attributes with and without the user specified constraint. This allows the user to rapidly gain a more thorough understanding of the data being mined. In addition, using constraints allows the user to focus on certain data areas, and allows the user to do recursive visual data mining, with each iteration reducing the data set according to the user's intensions. Constrained data can also be output from the software 100 and provided to users who have narrower interests and will use another copy of the software 100 to perform further data mining.

In certain data sets imposition of a constraint may introduce trends that are not manifest in the full data sets. Optionally the data mining software 100 can automatically apply each n-rule (where n is one or more) constraint and calculate the strength of trends using the TV formula given above. The calculated trend strength is then compared to the calculated TV values without the constraint. If there is a significant change (e.g., increase) in trend strength as a result of an imposed constraint, information to this effect can be output by the software 100 to the user. In the case that n-rule constraint is a two-rule constraint that includes a class attribute constraint and a non-class attribute constraint, one way to the inform the user of the effect of the constraint is to place a small GUI element, e.g., an up arrow 1328 or a small down arrow 1330 in a grid square 1313 of a rule cube, e.g., 1312 that has the same class value and non-class attribute value as the constraint. The up arrow 1328 and down arrow 1330 can also be differentiated by color e.g., green for up and red for down. Brightness, hue, saturation or size of the arrows 1328, 1330 can also be used to communicate the degree of the effect of the constraint on the trends. Brightness, hue and saturation are three different color parameters. When the user selects one of the arrows 1328, 1330 additional information on the constraint related trends will be shown in the side panel 1306. The information will identify attributes for which there was a significant change in trend strength when the constraint was imposed. Alternatively, a new panel (not shown) can be used to show the information and the related rule cubes, using presentations similar design to those shown FIGS. 12, 13.

Figure 21:
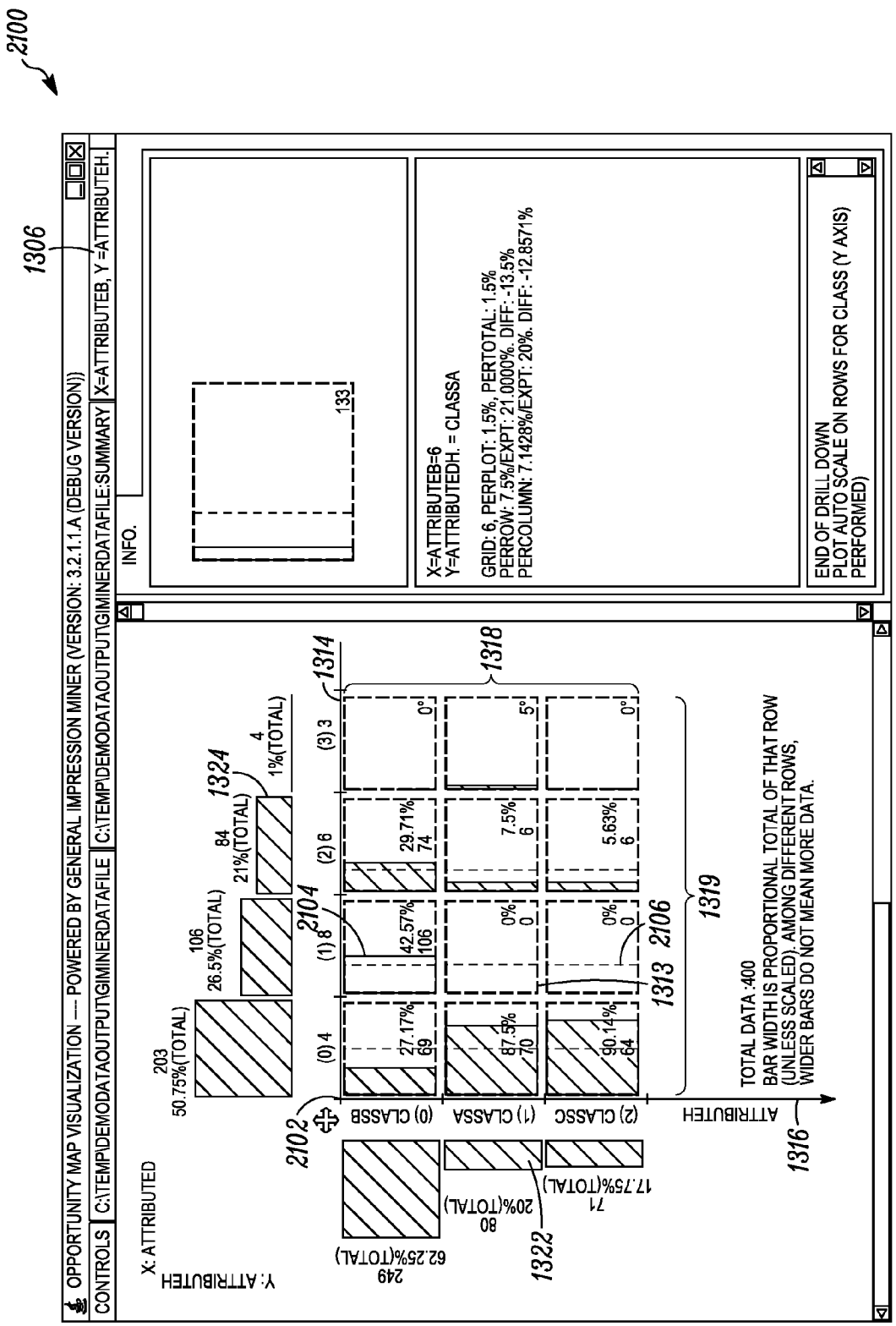
FIG. 21 is view of the GUI showing a rule cube with horizontally extending bars that have widths that represent variations in confidences when a Y-axis attribute (e.g., class attribute) is fixed while a X-axis attribute is varied.

FIG. 21 is a view of the GUI showing a rule cube 2102 with horizontally extending bars 2104 (one of which is numbered) that have widths that represent variations of confidence values when a Y-axis attribute (e.g., class attribute) is fixed while an X-axis attribute is varied. Thus, whereas each $(i,j)^{TH}$ vertically extending bar 1315 in the view shown in FIG. 13 has a height proportional to the number of data records that have a $j^{TH}$ X-axis attribute value that also have the $i^{TH}$ Y-axis attribute value (e.g., class value), in FIG. 21 each $(i,j)^{TH}$ horizontally extending bar 2104 has a width that is proportional to the number of records that have the $i^{TH}$ Y-axis attribute value that also have a $j^{TH}$ X-axis attribute value. Each column 1319 of the rule 2102 includes a vertically extending line 2106 that shows the prior probability of each horizontally extending bar that considers only the X-axis attribute value count. FIG. 21 provides an alternative to FIG. 13 that may be selected by the user. The alternative rule cube views shown in FIG. 13 and FIG. 21 emphasize different contexts for the individual rules. The view shown in FIG. 21 emphasizes the context of rules with the same Y-axis (e.g., class) attribute value because the bar width in the same row are directly comparable, whereas the view shown in FIG. 13 emphasizes the context of rules with the same X-axis (e.g., non-class attribute) because the bar heights in the same column are directly comparable (except where some non-uniform scaling is applied). On the other hand the horizontal lines 1320 and the vertically extending lines 2106 provide other opposite types of context in the respective rule cubes 2102, 1312.

Note that the grid squares in FIG. 20 include vertically extending bars that have heights that reflect the percentage of data samples having the X-axis attribute value that have the Y-axis attribute value (with and without a constraint). Alternatively, under user control, the software 100 can generate a view similar to FIG. 20 showing bars that reflect percentages with and without a constraint but differing from FIG. 20 in that the bars are horizontally extending like bars 2104 in FIG.

21 and have widths that reflect the percentage of data samples having the Y-axis attribute value that have the X-axis attribute value.

Figure 22:
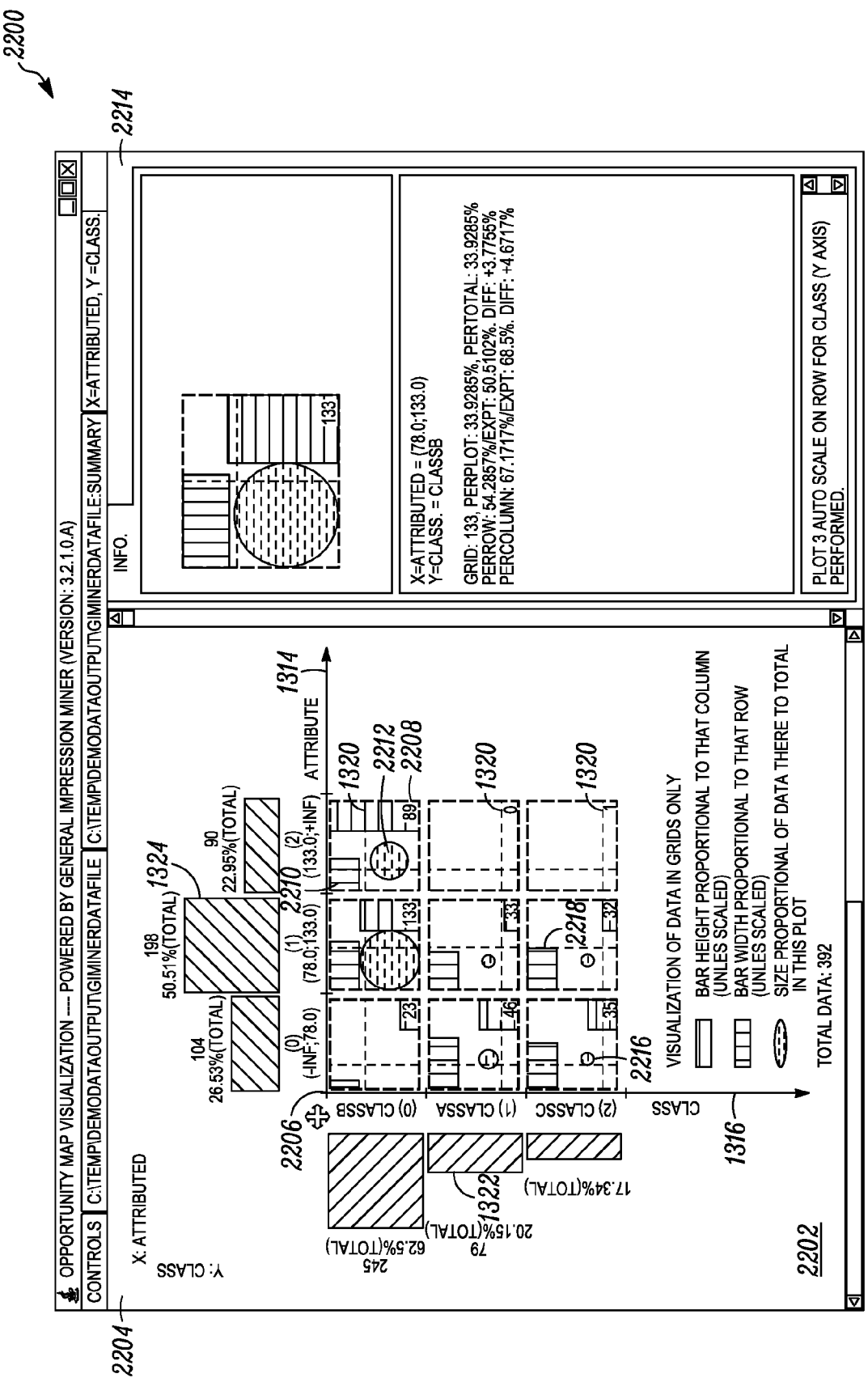
FIG. 22 is a view of the GUI showing a rule cube, with the relative confidence of each rule when each of two, or neither attribute value is fixed, being communicated by three different shapes of different sizes and colors.

FIG. 22 is a view of a GUI window 2200 showing a graphical representation 2202 of related rules in a context of similar rules, with the relative confidence of each rule when each of two attribute values, or neither are fixed, being communicated by shapes of different sizes. The graphical representation 2202 which appears in a left panel 2204 of the window 2200 includes a rule cube 2206 that includes more information than the rule cubes described above. The rule cube 2206 includes a matrix of grid squares. Each grid square includes a vertically extending bar (rectangle) 2208, a horizontally extending bar (rectangle) 2210 extending from a left side of each square and a disk 2212 of some radius as will be described. The foregoing graphical elements can be displayed in contrasting colors, e.g., blue, red, and gray respectively.

The vertically extending bars 2208 are analogous to the bars 1315 of the rule cube 1312 shown in FIG. 13. Each particular $(I,J)^{TH}$ vertically extending bar 2208 has a height that is proportional to a percentage of a set of data samples that have an attribute value corresponding to a $J^{TH}$ column in which the bars 2208 appear that also have an $I^{TH}$ value of an attribute corresponding to an $I^{TH}$ row in which the particular $(I,J)^{TH}$ bar 2208 appears. On the other hand each particular $(I,J)^{TH}$ horizontally extending bar 2210 has a width that is proportional to a percentage of the set of data samples that have an attribute value corresponding to a $I^{TH}$ row in which the bars 2210 appear that also have a $J^{TH}$ value of an attribute corresponding to a $J^{TH}$ column in which the particular $(I,J)^{TH}$ bar 2210 appears. The horizontally extending bars 2210 are analogous to the bars 2104 of the rule cube 2102. Each particular $(I,J)^{TH}$ disk 2212 has an area that is proportional to a percentage of the set of data samples that have both the $I^{TH}$ value of an attribute corresponding to an $I^{TH}$ row and the $J^{TH}$ value of an attribute corresponding to an $J^{TH}$ column in which the disk appears. Alternatively, the disk size 2212 (area) can be fixed, but the saturation (or brightness) of the color can be used for the to communicate the foregoing percentage. The data set may be the complete data set read in block 104 or a subset defined by a constraint, e.g., a constraint applied using the dialog box 1900 shown in FIG. 19. In addition to the horizontal lines 1320 discussed in connection with FIG. 13, each column of the rule cube 2206 includes a vertical line 2216 that indicates a prior probability for the width of each horizontal extending bar 2210 that takes into considers only the sample count for each X-axis attribute value. Thus, the vertical line 2216 for each column is displaced from a left side of its respective column by an amount proportional to a bar for the respective column in the summation histogram 1324 above the X-axis 1314. Once the user becomes familiar with the graphical representation 2202 it can serve to rapidly convey a large amount of information.

A right side panel 2214 of the window 2200 will show an enlarged view of a grid square of the rule cube 2206 that the user selects (e.g., with a mouse pointer), and numerical percentages represented by the vertical bar 2208, horizontal bar 2210 and disk 2212 in the selected grid square as well as attribute names and value.

Figure 23:
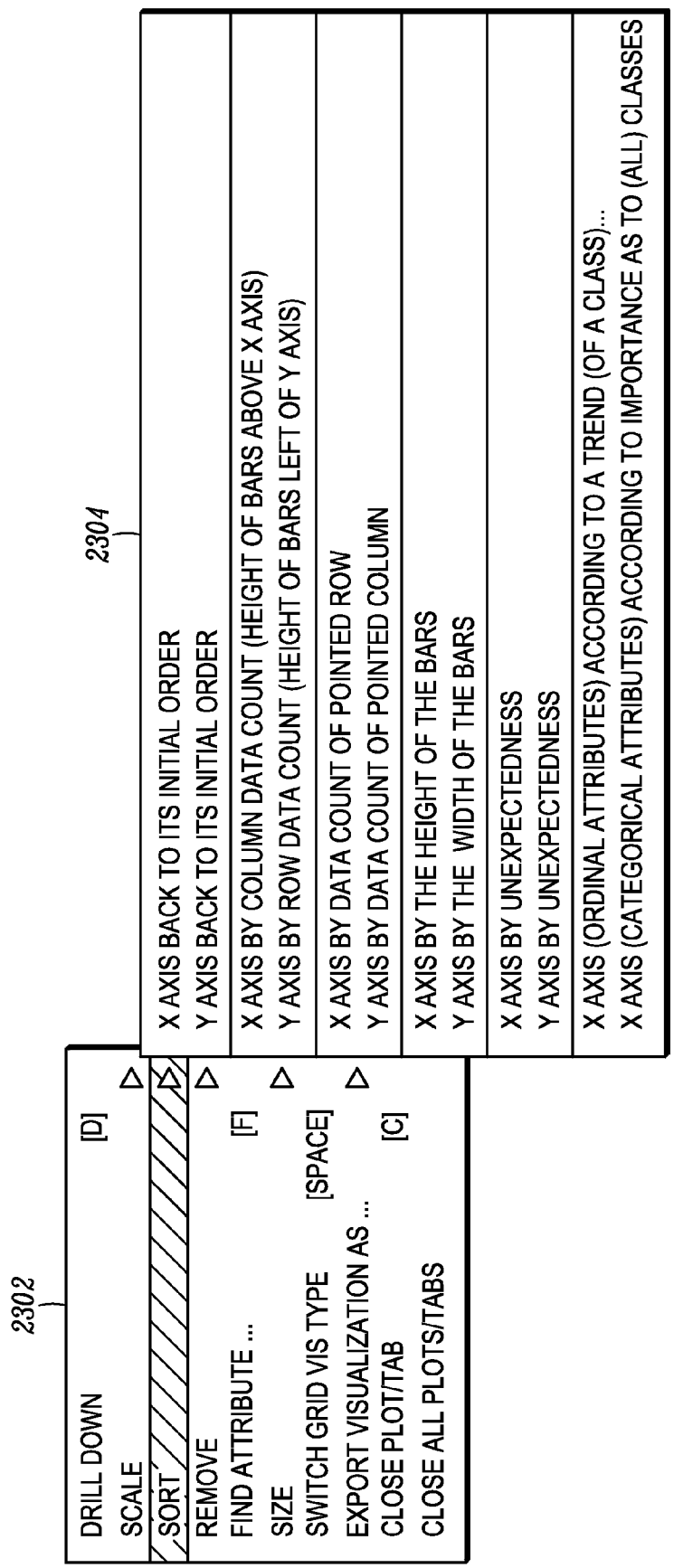
FIG. 23 shows a menu and a first sub-menu of the GUI of the data mining software that includes a number of sort options.

FIG. 23 shows a menu 2302 and a sort sub-menu 2304 of the GUI of the data mining software 100 that includes a number of sort options. Certain options under the sort sub-menu 2304 are for sorting rows or columns of rule cubes (and associated sum histograms above the X-axes and to the left of the Y-axes) and certain options are for sorting entire columns of grid squares in the high level visualization of many attributes e.g., shown in FIG. 12.

The last two sorting options are for high level visualizations, first two sorting options can be used for both rule cubes and high level visualizations and the middle sorting options are for rule cubes. A first X-axis option on the sort sub-menu 2304 "X-axis back to its initial order" allows to the user to restore the original order after having performed other sorts.

A second X-axis option "X Axis by column data count (height of bars above X axis)" allows the user to sort columns of a rule cube (and the associated sum histogram above the X-axis) according to the column sums reflected in the sum histogram.

A third X-axis sort option "X Axis by data count of pointed row" sorts the columns according to the counts in a row which the user has selected (e.g., with the mouse).

A fourth X-axis sort option "X-axis by height of bars" sorts the columns according to the data count of grid squares in a user selected row as of percentage of the respective column sums.

A fifth X-axis sort option "X-axis by unexpectedness" sorts the columns according to a metric of exception of the rules in a row that the user has selected (e.g., with the mouse pointer). One metric of exception is the degree of exception DE given above. Note that the user can choose whether to use absolute value or not in the above formula by using a small menu (not shown) that appears when this option is selected.

A sixth and a seventh X-axis sort options apply to high level views with many attributes, e.g., FIG. 12. The sixth X-axis sort option is "X-axis (ordinal attributes) according to a trend (of a class) . . . " When this option is used a dialog box (not shown) will be opened for the user to select a class and to select a trend type (e.g., increasing, decreasing). After receiving this information the columns will be sorted according to the strength of the specified trend type within the selected class. The class may also be selected using the mouse pointer. The formula TV given above may be used as the basis of this sorting.

A seventh X-axis sort option is "X-axis (categorical attributes) according to importance as to (all) classes". This option will sort the columns of the high level visualization e.g., FIG. 12 according to the metric of discriminative power $DP_\Sigma$ for which a formula is given above.

There are five Y-axis sort options which all apply to the rule cubes and the additional histogram 1316 to the left of the Y-axis. A first Y-axis sort option is "Y-axis back to its initial order" restores an original order after other Y-axis sorting has been performed.

A second Y-axis sort option "Y-axis by row data count (height of bars left of Y axis)" sorts the rows of the rule cube and bars of the additional histogram 1316 according to the counts reflected in the additional histogram 1316.

A third Y-axis sort option "Y Axis by data count of pointed column" sorts the rows according to the data counts in a column which the user has selected (e.g., with the mouse).

A fourth Y-axis sort option "Y-axis by width of bars" sorts the rows of the rule cube according to the width of bars 2104, 2210 in a column selected by the user. As indicated above the width is proportional to a percentage of the set of data samples that have an attribute value corresponding to a selected $I^{TH}$ row that also have a $J^{TH}$ value of an attribute corresponding to a $J^{TH}$ column in which each particular $(I,J)^{TH}$ bar 2104, 2210 appears.

A fifth Y-axis sort option "Y axis by unexpectedness" sorts the Y-axis according to a metric of exception of the rules in a column that the user has selected (e.g., with the mouse pointer). A suitable metric of unexpectedness can be derived from the formula for DE given above but with the role of the non-class attribute and the class attribute reversed. Note that the user has the option of whether to use absolute value or not in the above formula.

Note that as shown in FIG. 23 there are no Y-axis related sorts analogous to the last two X axis related sorts. Alternatively, analogous Y-axis related sorts can be provided.

All of these various sorts described above allow the user a high degree of freedom in exploring a large high dimensional data set and testing theories using the data set. Thus, these sort capabilities generally enhance the data mining functionality of the software 100.

Figure 24:
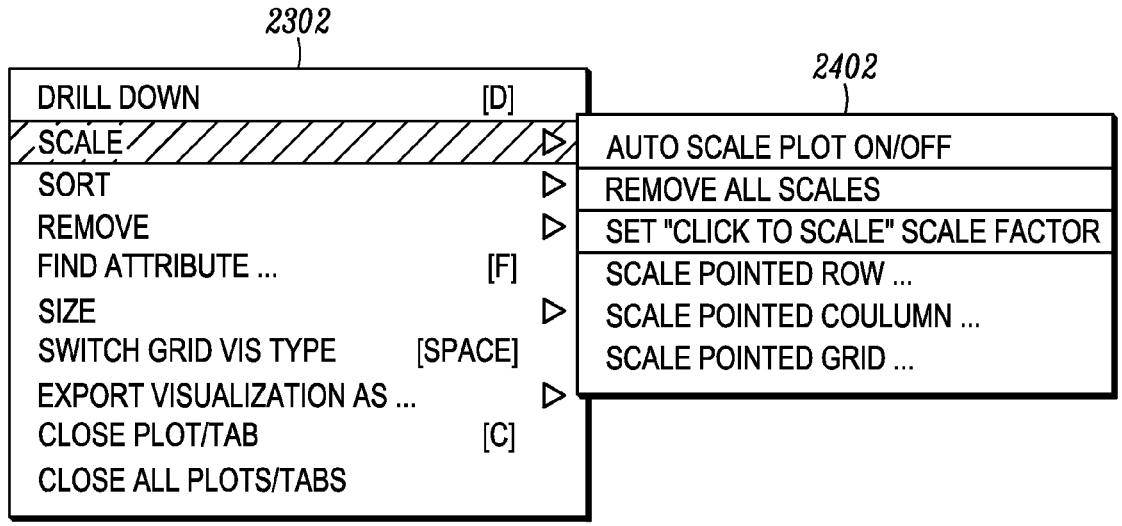
FIG. 24 shows the menu of the GUI and a second sub-menu that includes a number of scaling functions.

FIG. 24 shows the menu 2302 of the GUI and a second sub-menu 2402 that includes a number of scaling functions. A first option in the sub-menu 2402 "Auto Scale plot On/Off" toggles an auto scaling function on and off. The auto scaling function serves to increase the legibility of histograms displayed by the data mining software 100. Auto scaling activates in two cases. One case in which auto scaling will be activated is if all bars in a row are very low making it difficult for the user to visually assess the relative heights. The latter condition can be detected by comparing all of the row heights to a pre-programmed upper bound. The pre-programmed upper bound is suitably a value in the range of 0.05 to 0.20. A value of 0.15 has been used in an implementation. If the foregoing condition for applying scaling is met a positive scaling factor is calculated such that a maximum bar height is scaled up to a predetermined height, e.g., 1.0. The same scaling factor is then applied to all the bar heights in the row. For example, consider a row that has three bars of height 1.1% 1.5% and 1.25%. The bars are so small and close in height that it is difficult to judge their relative height, especially in view of the ordinary resolution limitations of computer monitors. Nonetheless there is a significant 36% difference between the lowest and the highest bar height which may be important for understanding the data being mined especially if these are heights of bars in an import but relatively rare class, e.g., failed during set up in the case of the mobile telephone data mining application mentioned in the background or succumbed to illness in the case of a medical record data mining application. To make the data in the example more legible the auto scale function will multiply each bar height by a factor of 66.67 resulting in bar heights of 73.3%, 100.0% and 83.3% which the user will readily be able to differentiate.

Another case in which auto scaling will be activated is if all the bars in a row are very high also making it difficult for the user to visually assess the differences in the bar height. The latter condition can be detected by comparing all bar heights in the row to a specified lower bound. The lower bound is suitably between 0.75 and 0.99. A lower bound of 0.85 was used in an implementation. If this latter condition is detected, then the auto scaling function is used to transform the values through a linear transformation in order to increases the differences in the bar heights. One suitable linear transform is given by the following formula:

$$ai\_new = \frac{ai + N\_negative}{1 + N\_negative}$$

where, ai is a bar height (normalized to between 0 and 1) before transformation;

ai_new is new bar height after transformation; and

N_negative is a negative scaling factor that is computed so that the smallest bar height will be scaled to a pre-programmed value, e.g., zero. In order for the smallest bar height to be zero, N_negative is simply set to the smallest bar height. If smallest bar height is to be set to another pre-programmed value (e.g., 0.1), the formula can simply be solved for N-Negative after plugging in the pre-programmed value and the smallest bar height before scaling.

An example of a case where auto scaling can effectively be applied is the case of a row containing three bars of heights of 95.5% 95.7% and 96%. Setting the scaling factor N_negative to −0.94 and applying the preceding formula to these bar heights after converting to decimals yields bar heights of 0.25, 0.283 and 0.333 (25% 28.3% and 33.3%). Thus differences in the bar heights will be readily perceptible after transformation.

It should be noted that scaling can also be applied to the width of bars 2104, 2210 in FIG. 21 as well.

Bars to which auto scaling has been applied by the software 100 are color coded with a pre-programmed color in order to alert the user. Different colors can optionally be used to differentiate negative scaling from positive scaling.

A second option of the sub-menu 2402 "Remove All Scales" removes all previously applied scaling.

A third option "Set "Click to Scale" Scale Factor" of the sub-menu 2402 opens up a dialog box (not shown) in which the user can specify a positive or negative scaling factor and designate whether rows or columns are to be scaled in response to mouse double clicks. After entering in the foregoing information when the user double clicks a grid square, a row, or a column, it will be scaled using the scaling factor entered in the aforementioned dialog box. This option applies to all types of visualizations. This option allows the user to rapidly go through rule cubes and high level visualizations of the software 100 and scale different rows, columns, or grids as desired.

A fourth option of the sub-menu 2402 "Scale Pointed Row . . . " is used to scale a particular row that the user has specified with the mouse pointer. To specify a row the user will click a corresponding bar of the sum histogram at the far left of the display (to the left of the Y-axis). After selecting this option a dialog box (not shown) will be opened in order to accept a user input of a scaling factor.

A fifth option of the sub-menu 2402 "Scale Pointed Column . . . " is used to scale a particular column that the user has specified by clicking on a corresponding bar in the sum histogram above the X-axis. After selecting this option the aforementioned dialog box will be opened in order to accept a user input of a scaling factor.

Finally, a sixth option of the sub-menu 2402 "Scale Pointed Grid . . . " is used to specify scaling for one particular grid square. This scaling will override any preceding scaling of a row or column containing the scaled individual grid square. As in the preceding two options a dialog box is used to specify the scaling factor.

When a scaling factor is selected by the user manually, scaling may result in certain bar heights being out of bounds, e.g., outside the range 0 to 1 (or 0% to 100%). In order to alert the user that scaling has resulted in calculated bar heights that are out of bounds the software 100 uses two methods. For calculated bar heights that are less than zero the software 100 will draw a very small bar in a special pre-defined color that signifies a below zero out of bound bar height. For calculated bar heights that are greater than one the software will draw a bar that extends slightly beyond a horizontal line demarcated a top boundary of the grid square in which the bar is located.

An additional "Remove" option of the menu 2302 opens a dialog box (not shown) that allows the user to remove columns or rows from the visualizations, e.g., FIG. 12.

Figure 25:
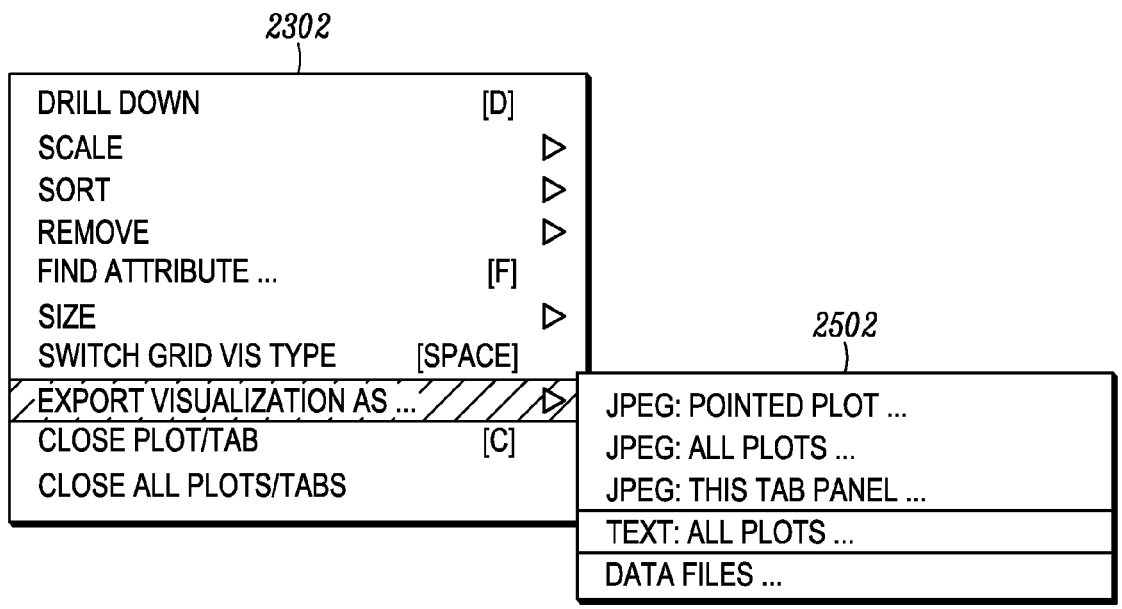
FIG. 25 shows the menu of the GUI and a third sub-menu that includes a number of output functions.

FIG. 25 shows the menu of the GUI 2302 and a third sub-menu 2502 that includes a number of JPEG and text export options. The JPEG options will save one rule grid visualization, multi rule grids visualization, or part or the whole GUI screen to a JPEG file, whose file name is provided by user using a dialog box (not shown). The text output will save all the textual information in the visualization, as well as those in the related informative panels or logs, to a text file. The data file export option will export the data set of a subset resulting from application of constraints or removal of rows or columns. The exported data file can be reloaded into the software 100 at a later time for further data mining.

The "Find Attribute" option of the menu 2302 opens up a dialog box (not shown) that facilitates finding attributes by allowing the user type in an attribute name instead of manually scrolling in order to find attributes. The "Size" menu option allows the user to increase or decrease the size of the histograms and rule cubes, etc to suit the user's monitor size. The "Switch Grid Vis Type" menu option switches among different visualization modes (as illustrated in 2002, 2102, 2206, 2802) of the same rule cube(s). The "Close Plot/Tab" option closes an active plot or tab and the "Close All Plots/Tabs" menu option closes all tabs and plots.

Figure 27:
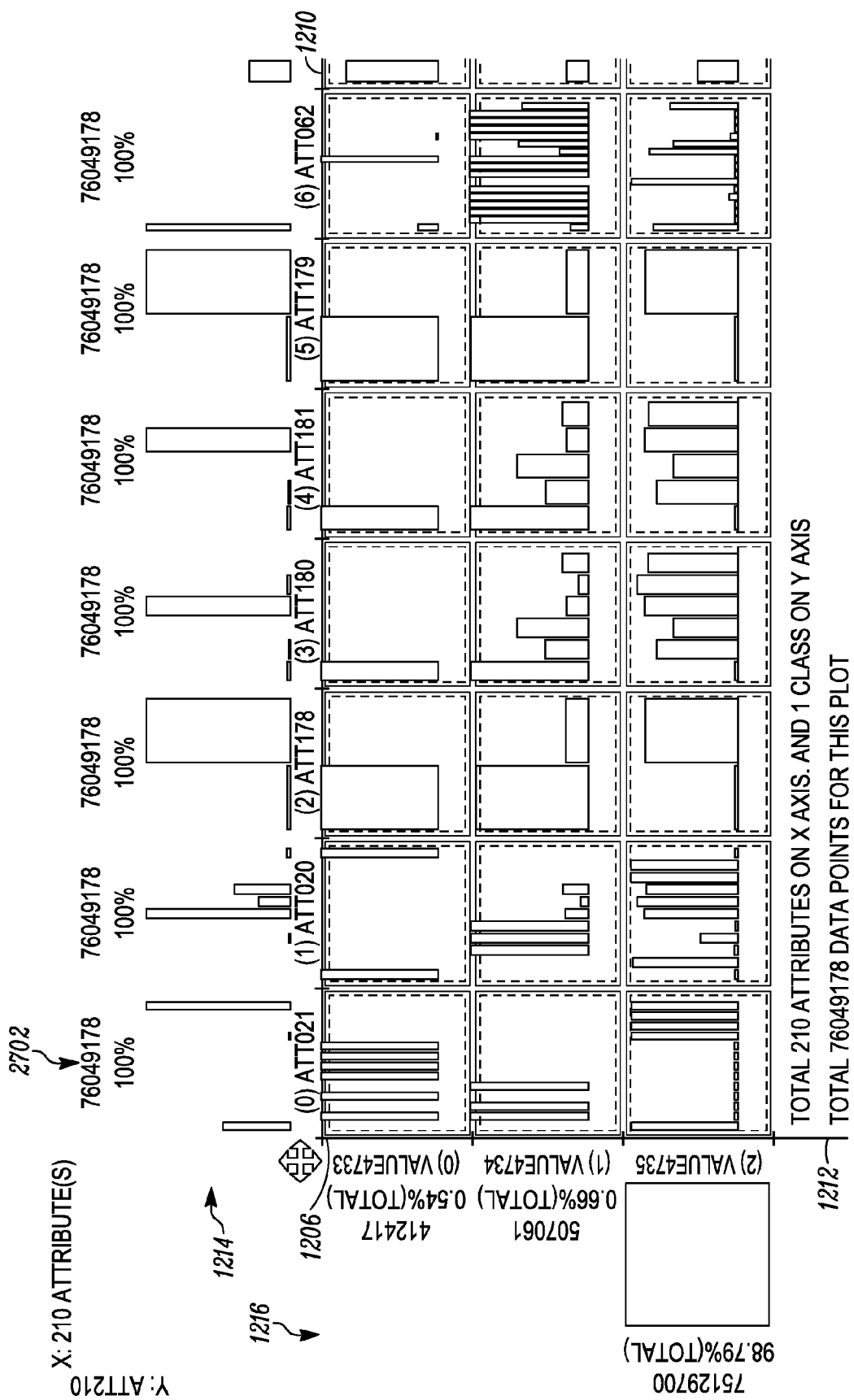
FIG. 27 is a view of the GUI showing histograms sorted by strength of discriminative power summed in a weighted sum over all three classes.

FIGS. 26, 27 show additional instances of the high level view shown in the left panel 1202 of FIG. 12. In FIG. 26 columns of histograms in the grid 1206 are sorted according to strength of increasing trends in one of three classes, in particular the class corresponding to the first row 2602 of grid 1206. This sorting which can be based on any of the classes is another type of "General Impressions" meta data that the data mining software 100 is able to present to the user. Identifying factors (i.e., attributes to the software 100) that will have a strong effect on an outcome (e.g., succumbing to an illness in a medical application) is important to users of data mining software. The quantifying of trends strengths, ranking of attributes by these quantifications and presentation in the sorted presentation in FIG. 26 is one way that allows users of the data mining software 100 to rapidly ascertain which attributes are important and why they are important.

Concerning the scaling discussed above, note that in FIG. 26 in certain grid squares 2606 histograms will be colored in a certain color (e.g., red) to indicated that user specified scaling has caused an underflow i.e., some bar heights have negative calculated values after scaling. Bars that have negative calculated heights are shown with a very small positive height.

Note also that in certain gird squares 2608 the histograms are colored in another different color—for example the same hue but a lighter shade of a default color used for the histograms, e.g., light blue. The latter distinctive coloring is used to identity histograms for attributes that have so many values that there is insufficient space in the grid square to draw bars for all attribute values. Alternatively, a small scroll bar (not shown) can be added to grid squares so that the user can scroll to see additional bars. In cases that both of the foregoing special conditions obtain, then, in the present implementation the color that signifies the underflow condition will prevail. Alternatively a variegated bar or histogram may be used to signify that both conditions exist. If there are too many rule values to show all bars in a histogram in the grid square of the grid 2608, then the user can see an enlarged version of the particular histogram with all bars by clicking on the grid square. This view shown in FIG. 26 results from using the "X-axis (ordinal attributes) according to a trend (of a class) . . . . "

FIG. 27 is an additional instance of the high level view shown in the left panel 1202 of FIG. 12. In FIG. 27 columns of the grid 1206 are sorted by strength of discriminative power among all three classes. It is noteworthy that the very high discriminative power of the non-class attribute corresponding to a first column 2702 is manifested by the fact that in the first column 2702 each value of the non-class attribute has a non-zero count for one and only one class attribute value—in other words each value of this non-class attribute uniquely maps to a single class. Successive columns manifest lesser discriminative power. The sorting shown in FIG. 27 is another type of the "General Impressions" meta data that the data mining software 100 is able to present to the user. This view allows the user quickly find the attributes which have the highest discriminative power, even in large high dimensional (e.g., 200 dimensions) data sets. This view results from using the sort option "X Axis (categorical attributes) according to importance as to (all) classes"

Figure 28:
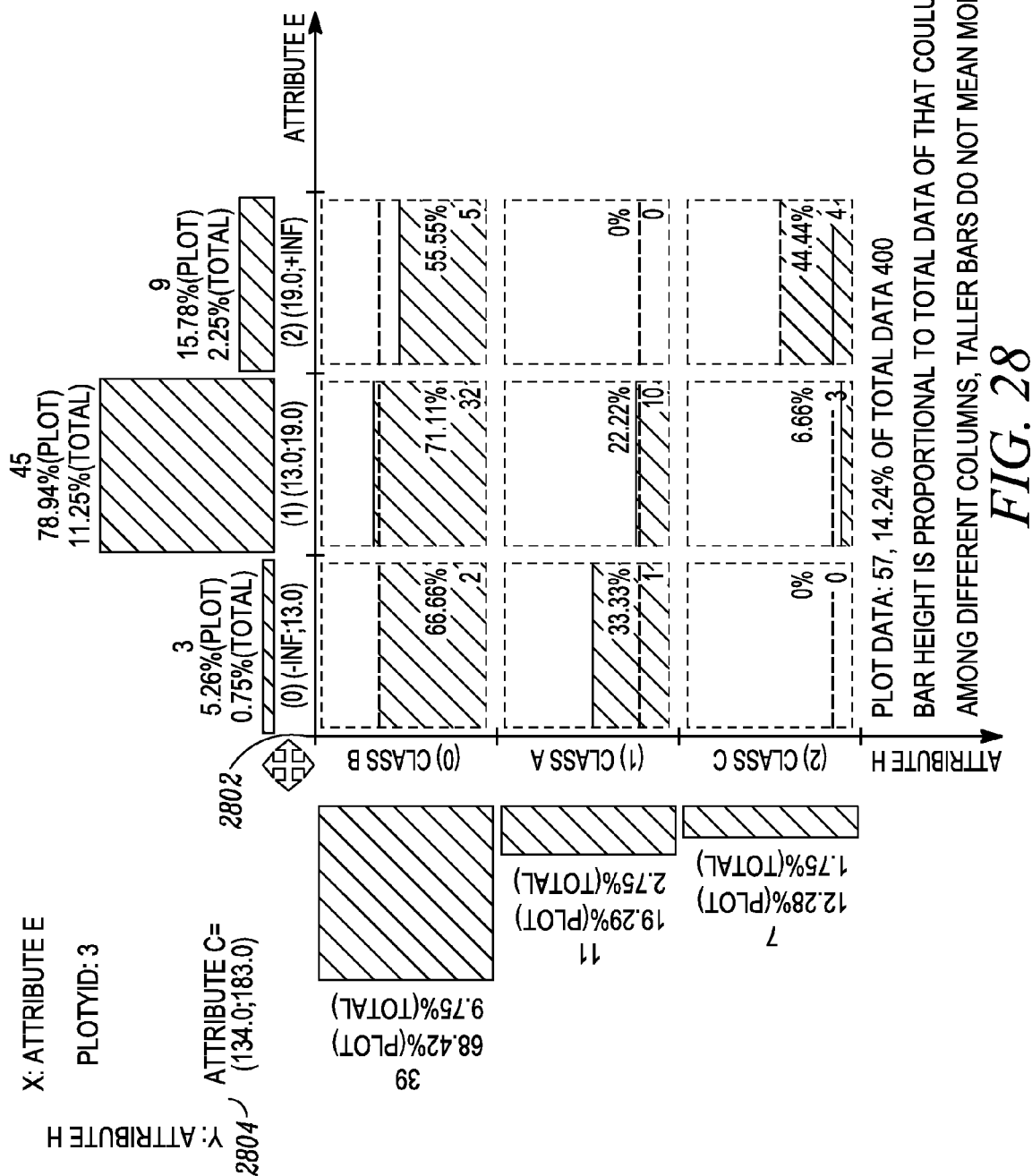
FIG. 28 is a view of the GUI showing a rule cube with a constraint.

FIG. 28 shows an instance of a rule cube 2802 visualization with one data constraint. This rule cube 2802 is shown in the GUI 2100 as an alternative visualization. The rule cube 2802 differs from the presentation shown in FIG. 20, in that rule cube 2802 only reflects information with a data constraint, whereas FIG. 20 shows two superposed rule cubes for the data with and without the data constraint. The data constraint 2804 is shown on a top left of the cube 2802 (i.e., "AttributeC= [97.0; 168.0]"). If there are multiple data constraints, they can be readily shown there as well (such as: "AttributeC=[97.0; 168.0], AttributeF=[12; 20]").

Figure 29:
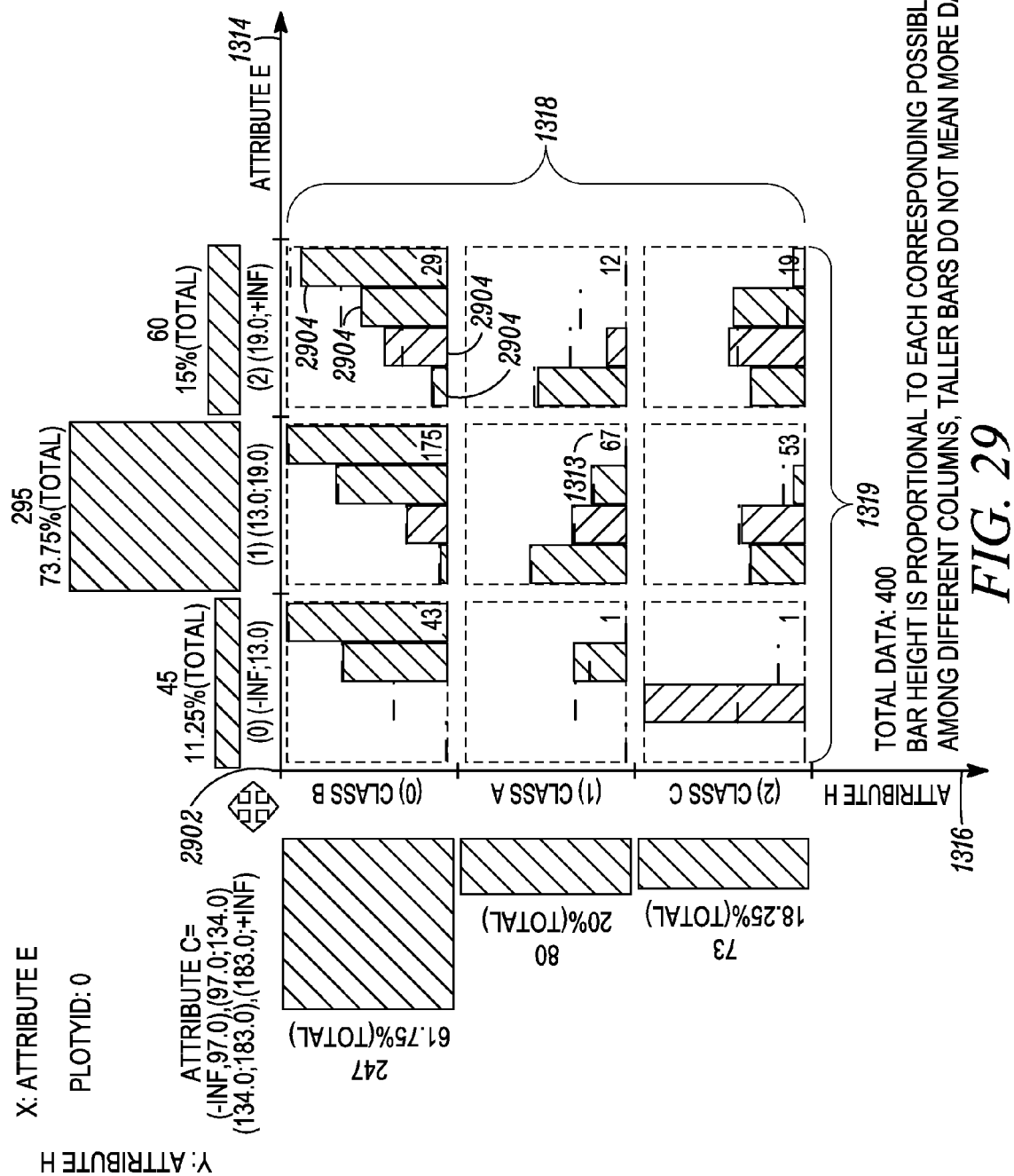
FIG. 29 is a view of the GUI showing a rule cube in which each grid square includes bars for different values of a third attribute.

FIG. 29 shows an instance of a rule cube 2902 that presents information on three attributes. The rule cube 2902 includes the plurality of grid squares 1313 arranged in the plurality of rows 1318 and the plurality of columns 1319 as before. Also as before each column corresponds to a value of an attribute associated with the X-axis 1314, and each row corresponds to a value of an attribute associated with the Y-axis 1316. In FIG. 29 the X-axis attribute is "AttributeE" and the Y-axis attribute is "AttributeH". In FIG. 29 each grid square 1313 includes plurality of bars 2904 including one for each of multiple values of a third attribute. In FIG. 29 the third attribute is "AttributeC". The values of the third attribute that are represented within each grid square are shown at the upper left of the rule cube 2902. The user may select to include all or a subset of the values of the third attribute for inclusion in the rule cube 2902. The user enters information define the rule cube 2902 using the dialog box 1900 shown in FIG. 19.

The rule cube 2902 helps the user compare multiple values of three attributes. This can be very useful, for example, in the medical data mining application mentioned above. For example, if one particular attribute is patient resting heart rate, it may be informative to compare how the heart rate (used as the third attribute) effects a correlation of occurrence of a first disease (indicated by the Y-axis attribute), and another known condition (indicated by the X-axis attribute).

FIG. 29 can be viewed as having multiple rule cubes interleaved side by side. Each of the interleaved rule cubes is analogous to the rule cube shown in FIG. 28. Within each grid square the width of each bar is reduced so multiple bars can fit in one grid square. This makes comparative study easy. When the user moves the mouse pointer over one bar the position of the mouse pointer will be sensed and that bar and other bars corresponding to the same value of the third attribute will be highlighted (e.g., changed to a different color or blinked) through out the rule cube 2902. Also, related text information of the attribute names, attribute values, data counts, data percentages, etc, will be shown in the right panel 1306 (shown in FIG. 13).

Figure 30:
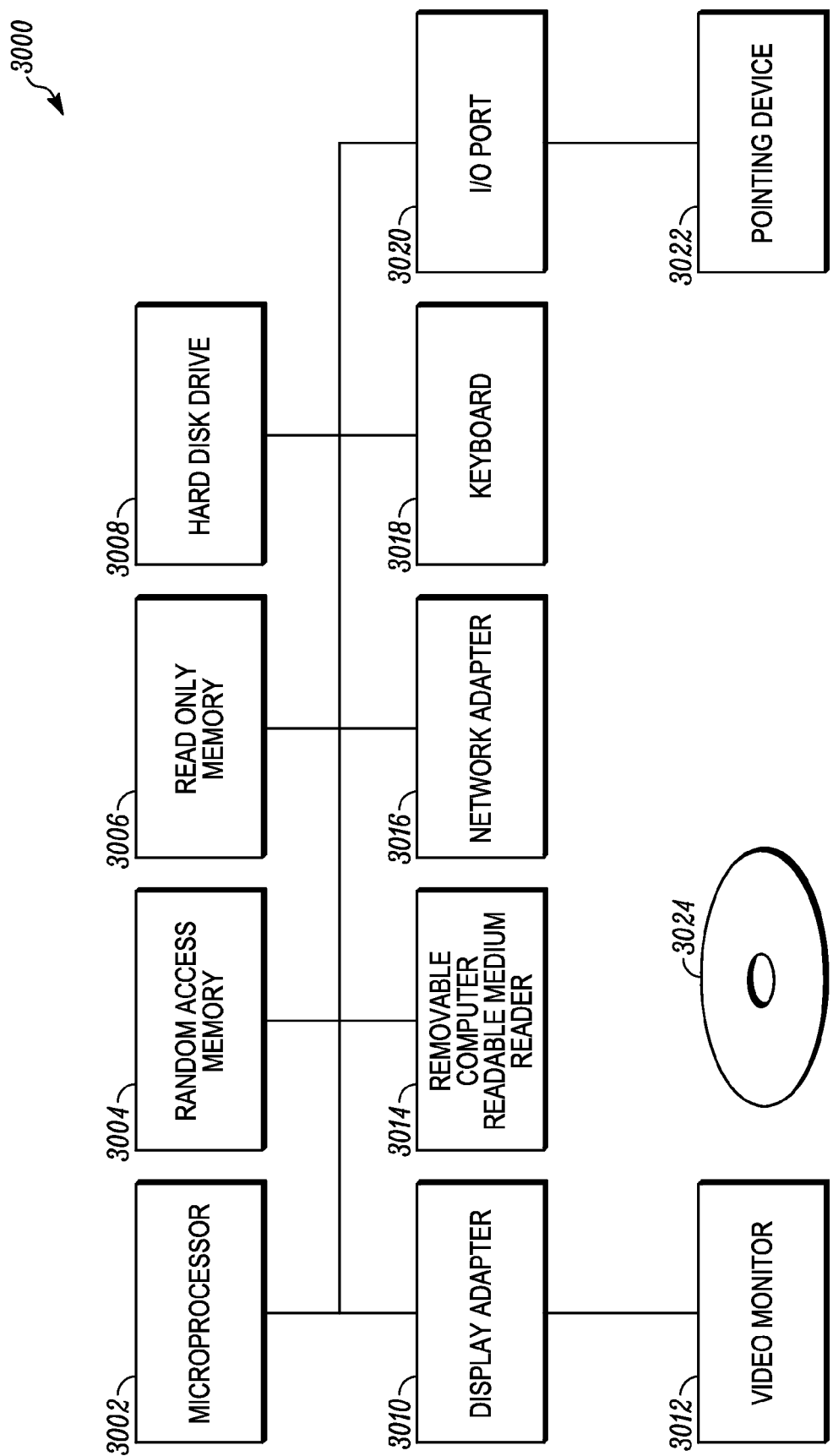
FIG. 30 is a block diagram of a computer that is used to run the data mining software according to an embodiment of the invention.

FIG. 30 is a block diagram of a computer that is used to run the data mining software 100 according to an embodiment of the invention. The computer 3000 comprises a microprocessor 3002, Random Access Memory (RAM) 3004, Read Only Memory (ROM) 3006, hard disk drive 3008, display adapter 3010, e.g., a video card, a removable computer readable medium reader 3014, a network adaptor 3016, keyboard 3018, and I/O port 3020 communicatively coupled through a digital signal bus 3026. A video monitor 3012 is electrically coupled to the display adapter 3010 for receiving a video signal. A pointing device 3022, suitably a mouse, is coupled to the I/O port 3020 for receiving signals generated by user operation of the pointing device 3022. The network adapter 3016 can be used, to communicatively couple the computer to an external source of data, e.g., a remote server. A computer readable medium 3024, that includes the data mining software 100. The software 100 is loaded through the removable computer readable medium reader 3014 in order to configure the computer 3000 to run the software. The software 100 is executed by the microprocessor 3002. The software includes programming instructions to carry out the functions described above. The computer 3000 may for example comprise a personal computer or a work station computer. A variety of types of computer readably medium including, by way of example, optical, magnetic, or semiconductor memory are alternatively used to store the programs, subprograms and data-structures described above. The computer readable medium 3024 may be remote from the computer 3000 and accessed through a network. It will be apparent to one of ordinary skill in the programming art that the programs may be varied from what is described above.

As used herein the term "value" can be a single value, a range of values, or a set of values that are automatically or manually discretized and grouped into a single value, i.e., a "bin".

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A non-transitory computer-readable medium storing a program for interactive data mining including programming instructions for:

reading in a set of data vectors wherein each data vector comprises a class attribute, and a plurality of additional attributes;

counting a plurality of counts of times each particular attribute of said plurality of additional attributes, takes on each of a set of possible values for the particular attribute; and presenting a plurality of histograms on a computer display wherein each of said plurality of histograms includes counts for one of said plurality of additional attributes versus attribute value and wherein said plurality of histograms are presented in a sorted order;

wherein said sorted order is based on a sorting-of the histograms according to a metric of non-randomness of distributions shown in said histograms;

wherein the metric of non-randomness is a metric of discriminative power with respect to said class attribute.

2. The computer-readable medium according to claim 1 wherein said counting is subject to at least one constraint on at least one of said plurality of additional attributes.

3. The computer-readable medium according to claim 1 including additional programming instructions for:

discretizing attribute values of at least a subset of attributes in said set of data vectors prior to counting said plurality of counts.

4. The computer-readable medium according to claim 1 wherein the programming instructions for presenting the plurality of histograms on the computer display present different histograms corresponding to different values of the class attribute.

5. The computer-readable medium according to claim 4 wherein for each additional attribute the histograms corresponding to a set of values of the class attribute are arranged in a column on the computer display.

6. The computer-readable medium according to claim 5 wherein said metric on non-randomness is summed over a said set of values of said class attribute.

7. The computer-readable medium according to claim 1 wherein in response to a user designating one of said plurality of histograms showing an enlarged version of the designated histogram on the computer display.

8. The computer-readable medium according to claim 1 wherein said histograms are augmented by up and down arrows located proximate said histograms to show trend type.

9. The computer-readable medium according to claim 1 wherein certain of said histograms are truncated to show only a portion of attribute values and are color coded to indicate truncation.

10. The computer-readable medium according to claim 1 including additional programming instructions for automatically scaling the plurality of histograms.

* * * * *

UNITED STATES PATENT AND TRADEMARK OFFICE
CERTIFICATE OF CORRECTION

| | | |
|---|---|---|
| PATENT NO. | : 7,979,362 B2 | Page 1 of 2 |
| APPLICATION NO. | : 11/836849 | |
| DATED | : July 12, 2011 | |
| INVENTOR(S) | : Zhao et al. | |

It is certified that error appears in the above-identified patent and that said Letters Patent is hereby corrected as shown below:

On the Title Page, in the Figure, for Tag "114", Line 2, delete "TWO-CONTITION" and insert -- TWO-CONDITION --, therefor.

In Fig. 1, Sheet 1 of 25, for Tag "114", Line 2, delete "TWO-CONTITION" and insert -- TWO-CONDITION --, therefor.

In Fig. 2, Sheet 2 of 25, in Box, Line 1, delete "SAMPING" and insert -- SAMPLING --, therefor.

In Fig. 14, Sheet 11 of 25, Line 3, delete "ORIDIANAL" and insert -- ORDINAL --, therefor at each occurrence throughout the drawings.

In Fig. 16, Sheet 13 of 25, delete "FOR CLASS = CLASSA.," and insert -- FOR CLASS = CLASSA, --, therefor.

In Fig. 24, Sheet 20 of 25, for Tag "2402", Line 5, delete "COULUMN ..." and insert -- COLUMN ... --, therefor.

In Fig. 28, Sheet 23 of 25, delete "COULUMN (UNLESS SCALED)" and insert -- COLUMN (UNLESS SCALED) --, therefor.

In Column 15, Line 9, delete "Ai" and insert -- $A_i$ --, therefor.

In Column 15, Line 9, delete "bl" and insert -- $b_l$ --, therefor.

In Column 15, Line 10, delete "ck" and insert -- $c_k$ --, therefor.

Signed and Sealed this
Eighth Day of January, 2013

David J. Kappos
*Director of the United States Patent and Trademark Office*

CERTIFICATE OF CORRECTION (continued)
U.S. Pat. No. 7,979,362 B2

In Column 18, Lines 14-17, in Equation, delete " $$\frac{\sum_{\text{Class } C_i} \sum_{\text{Trend Type } b_l} \sum_{\text{Unit Trend } UT_{(b_l, c_i)}} \frac{\text{Min}(\text{Support}(UT_{(A, b_l, c_i)}), \text{Support}(UT_{(B, b_l, c_i)}))}{\text{Support}(c_i)}}{\text{Total Data Count}}$$ " and insert -- $$\frac{\sum_{\text{Class } C_i} \sum_{\text{Trend Type } b_j} \sum_{\text{Unit Trend } UT_{(b_j, c_i)}} \frac{\text{Min}(\text{Support}(UT_{(A, b_j, c_i)}), \text{Support}(UT_{(B, b_j, c_i)}))}{\text{Support}(c_i)}}{\text{Total Data Count}}$$ --, therefor.

In Column 21, Line 39, after "used for the", some text is missing.